(12) United States Patent
Han et al.

(10) Patent No.: US 9,102,520 B2
(45) Date of Patent: Aug. 11, 2015

(54) NANOCOMPOSITE STRUCTURES AND RELATED METHODS AND SYSTEMS

(75) Inventors: Si-Ping Han, Yorba Linda, CA (US); Hareem Maune, Pasadena, CA (US); Robert D. Barish, Pasadena, CA (US); William A. Goddard, III, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 348 days.

(21) Appl. No.: 12/540,027

(22) Filed: Aug. 12, 2009

(65) Prior Publication Data
US 2010/0048421 A1 Feb. 25, 2010

Related U.S. Application Data

(60) Provisional application No. 61/188,854, filed on Aug. 13, 2008, provisional application No. 61/189,792, filed on Aug. 22, 2008, provisional application No. 61/170,564, filed on Apr. 17, 2009.

(51) Int. Cl.
| | |
|---|---|
| *C07H 21/02* | (2006.01) |
| *C40B 40/04* | (2006.01) |
| *B82B 1/00* | (2006.01) |
| *B82Y 30/00* | (2011.01) |

(52) U.S. Cl.
CPC .. *B82B 1/00* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 6,777,180 B1 | 8/2004 | Fisher et al. | |
| 6,794,499 B2 | 9/2004 | Wengel et al. | |
| 7,498,423 B2 | 3/2009 | Zheng et al. | |
| 2002/0068708 A1* | 6/2002 | Wengel et al. | 514/44 |
| 2003/0215903 A1 | 11/2003 | Hyman et al. | |
| 2004/0132072 A1* | 7/2004 | Zheng et al. | 435/6 |
| 2004/0142324 A1 | 7/2004 | Bosio | |
| 2006/0228725 A1 | 10/2006 | Salafsky | |
| 2006/0246311 A1 | 11/2006 | Hartwich et al. | |
| 2010/0048421 A1 | 2/2010 | Han et al. | |

OTHER PUBLICATIONS

Park et al. J Phys Chem B. 2004. 108: 12375-12380.*
BioMath Calculator (retrieved on Sep. 28, 2011). Retrieved from the internet: <URL:http://www.promega.com/techserv/tools/biomath/calc11.htm#melt_results>.*
Seeman. Nature. 2003. 421: 427-431.*
Zheng et al. Nature Materials. 2003. 2: 338-342.*
Li. Angew. Chem. Int. Ed. 2007. 46: 7481-7484. (Including Supporting Information.).*
Non-Final Office Action for U.S. Appl. No. 12/540,052 by Maune et al. Dated Jul. 8, 2011.
Restriction Requirement for U.S. Appl. No. 12/540,052 by Maune et al. Dated Mar. 17, 2011.
Park et al. Structural Characterization of Oligonucleotide-Modified Gold Nanoparticle Networks Formed by DNA Hybridization. J. Phys. Chem. B. 2004. 108: 12375-12380.

(Continued)

*Primary Examiner* — Robert T Crow
*Assistant Examiner* — Joseph G Dauner
(74) *Attorney, Agent, or Firm* — Steinfl & Bruno LLP

(57) ABSTRACT

The disclosure relates to nanotube composite structures and related methods and systems. In particular, structures, methods and systems are provided herein to allow for precise, tunable separation between nanomaterials such as carbon nanotubes.

32 Claims, 18 Drawing Sheets

(56) References Cited

OTHER PUBLICATIONS

Soto et al. Controlled Assembly of Mesoscale Structures Using DNA as Molecular Bridges. J. Am Chem. Soc. 2002. 124(29): 8508-8509.

Mayer et al. Construction of DNA Architectures with RNA Hairpins. Agnew. Chem. Int. Ed. 2008. 47: 971-973.

Chworos et al. Building Programmable Jigsaw Puzzles with RNA. Science. 2004. 306: 2068-2072.

Adalye, F., et al., Dynamic DNA templates for discrete gold nanoparticle assemblies: Control of geometry, modularity, write/erase and structural switching, Journal of the American Chemical Society 2007, 129: 4130-4131.

Johnson, R., et al., Probing the structure of DNA—Carbon nanotube hybrids with molecular dynamics, Nano Letters 2008, 8: 69-75.

Park, S., et al., Finite-size, fully addressable DNA tile lattices formed by hierarchical assembly procedures, Angewandte Chemie 2006, 45: 735-739.

Zhang, y., et al., Construction of a DNA-truncated octahedron, Journal of the American Chemical Society 1994, 116: 1661-1669.

Javey, A., et al., Carbon nanotube transistor arrays for multistage complementary logic and ring oscillators. Nano Letters, 2002. 2(9): p. 929-932.

Kenji Hata, Don N. Futaba, Kohei Mizuno, Tatsunori Namai, Motoo Yumura, and Sumio Iijima. Water-assisted highly efficient synthesis of impurity-free single-walled carbon nanotubes. *Science*, 306(5700):1362-1364, 2004.

Ming Zheng, Anand Jagota, Ellen D. Semke, Bruce A. Diner, Robert S. Mclean, Steve R. Lustig, Raymond E. Richardson, and Nancy G. Tassi. DNA-assisted dispersion and separation of carbon nanotubes. *Nature Materials*, 2(5):338-342, 2003.

Michael S. Arnold, Alexander A. Green, James F. Hulvat, Samuel I. Stupp, and Mark C. Hersam. Sorting carbon nanotubes by electronic structure using density differentiation. *Nature Nanotechnology*, 1(1):60-65, 2006.

Ming Zheng, Anand Jagota, Michael S. Strano, Adelina P. Santos, Paul Barone, S. Grace Chou, Bruce A. Diner, Mildred S. Dresselhaus, Robert S. Mclean, G. Bibiana Onoa, Georgii G. Samsonidze, Ellen D. Semke, Monica Usrey, and Dennis J. Walls. Structure-based carbon nanotube sorting by sequence-dependent DNA assembly. *Science*, 302(5650):1545-1548, 2003.

X. Huang, R.S. McLean, and M. Zheng. High-resolution length sorting and purification of DNA-wrapped carbon nanotubes by size-exclusion chromatography. *Analytical Chemistry*, 77(19):6225-6228, 2005.

W.-Q. Deng, Y. Matsuda, and W.A. Goddard. Bifunctional anchors connecting carbon nanotubes to metal electrodes for improved nanoelectronics. *Journal of the American Chemical Society*, 129(32):9834-9835, 2007.

Qing Cao and John A. Rogers. Ultrathin films of single-walled carbon nanotubes for electronics and sensors: A review of fundamental and applied aspects. *Advanced Materials*, 21:29-53, 2009.

Richard D. Piner, Jin Zhu, Feng Xu, Seunghun Hong, and Chad A. Mirkin. "Dip-pen" nanolithography. *Science*, 283(5402):661-663, 1999.

C. Vieu, F. Carcenac, A. Pépin, Y. Chen, M. Mejias, A. Lebib, L. Manin-Ferlazzo, L. Couraud, and H. Launois. Electron beam lithography: resolution limits and applications. *Applied Surface Science*, 164:111-117, 2000.

S.Y. Chou, P. R. Krauss, and P. J. Renstrom. Imprint lithography with 25-nanometer resolution. *Science*, 272(5):85-87, 1996.

Wei Wu, William M. Tong, Jonathan Bartman, Yufeng Chen, Robert Walmsley, Zhaoning Yu, Qiangfei Xi, Inkyu Park, Carl Picciotto, Jun Gao, Shih-Yuan Wang, Deborah Morecroft, Joel Yang, Karl K. Berggren, and R. Stanley Williams. Sub-10 nm nanoimprint lithography by wafer bowing. *Journal of the American Chemical Society*, 8(11):3865-3869, 2008.

Yuhuang Wang, Daniel Maspoch, Shengli Zou, and George C. Schatz. Controlling the shape, orientation, and linkage of carbon nanotube features with nano affinity templates. *PNAS*, 103(7):2026-2031, 2006.

Michael R. Diehl, Sophia N. Yaliraki, Robert A. Beckman, Mauricio Barahona, and James R. Heath. Self-assembled, deterministic carbon nanotube wiring networks. *Angew. Chem. Int. Ed.*, 41(2):353-356, 2002.

Keith A. Williams, Peter T. M. Veenhuizen, Beatriz G. de la Torre, Ramon Eritja, and Cees Dekker. Nanotechnology: Carbon nanotubes with DNA recognition. *Nature*, 420:761, 2002.

Sébastien Lyonnais, Chia-Ling Chung, Laurence Goux-Capes, Christophe Escudé, Olivier Piétrement, Sonia Baconnais, Eric Le Cam, Jean-Philippe Bourgoin, and Arianna Filoramo. A three-branched DNA template for carbon nanotube self-assembly into nanodevice configuration. *Chemical Communications*, pp. 683-685, 2009.

K. Keren, R. S. Berman, E. Buchstab, U. Sivan, and E. Braun. DNA-templated carbon-nanotube field effect transistor. *Science*, 302(1380), 2003.

Miron Hazani, Frank Hennrich, Manfred Kappes, Ron Naaman, Dana Peled, Victor Sidorov, and Dmitry Shvarts. DNA-mediated self-assembly of carbon nanotube-based electronic devices. *Chemical Physics Letters*, 391:389-392, 2004.

J.P. Bourgoin, J. Borghetti, P. Chenevier, V. Derycke, A. Filoramo, L. Goux, M.F. Goffman, J.M. Bethoux, H. Happy, G. Dambrine, S. Lenfant, and D. Vuillaume. Directed assembly for carbon nanotube device fabrication. *proceedings of the International Electron Devices Meeting (IEDM)*, pp. 1-4, 2006.

Nadrian C. Seeman. Nucleic-acid junctions and lattices. *Journal of Theoretical Biology*, 99(2):237-247, 1982.

Nadrian C. Seeman. An overview of structural DNA nanotechnology. *Molecular Biotechnology*, 37(3):246-257, 2007.

Bruce H. Robinson and Nadrian C. Seeman. The design of a biochip: A self-assembling molecular-scale memory device. *Protein Engineering*, 1(4):295-300, 1987.

Chen and Nadrian C. Seeman. The synthesis from DNA of a molecule with the connectivity of a cube. *Nature*, 350:631-633, 1991.

W.M. Shih, J.D. Quispe, and G.F. Joyce. A 1.7-kilobase single-stranded DNA that folds into a nanoscale octahedron. *Nature*, 427(6453):618-621, 2004.

Dmytro Nykypanchuk, Mathew M. Maye, Daniel van der Lelie, and Oleg Gang. DNA-guided crystallization of colloidal nanoparticles. *Nature*, 451(7178):549-552, 2008.

Sung Yong Park, Abigail K. R. Lytton-Jean, Byeongdu Lee, Steven Weigand, George C. Schatz, and Chad A. Mirkin. DNA-programmable nanoparticle crystallization. *Nature*, 451(7178):553-556, 2008.

Yariv Y. Pinto, John D. Le, Nadrian C. Seeman, Karin Musier-Forsyth, T. Andrew Taton, and Richard A. Kiehl. Sequence-encoded self-assembly of multiple-nanocomponent arrays by 2D DNA scaffolding. *Nano Letters*, 5(12):2399-2402, 2005.

F.A. Aldaye and H.F. Sleiman. Dynamic DNA templates for discrete gold nanoparticle assemblies: Control of geometry, modularity, write/erase and structural switching. *Journal of the American Chemical Society*, 129(14):4130-4131, 2007.

Sung Ha Park, Peng Yin, Yan Liu, John H. Reif, Thomas H. LaBean, and Hao Yan. Programmable DNA self-assemblies for nanoscale organization of ligands and proteins. *Nano Letters*, 5(4):729-733, 2005.

Paul W. K. Rothemund. Folding DNA to create nanoscale shapes and patterns. *Nature*, 440:297-302, 2006.

A. DeHon. Array-based architecture for FET-based, nanoscale electronics. *IEEE Transactions on Nanotechnology*, 2(1):23-32, 2003.

C. Dwyer, V. Johri, M. Cheung, J. Patwardhan, A. Lebeck, and D. Sorin. Design tools for a DNA-guided self-assembling carbon nanotube technology. *Nanotechnology*, 15(9):1240-1245, 2004.

Jaidev P. Patwardhan, Vijeta Johri, Chris Dwyer, and Alvin R. Lebeck. A defect tolerant self-organizing nanoscale SIMD architecture. *SIGARCH Computer Architecture News*, 34(5):241-251, 2006.

Ph. Avouris, J. Chen, M. Freitag, V. Perebeinos, and J. C. Tsang. Carbon nanotube optoelectronics. *Physica status solidi. B. Basic research*, 243(13):3197-3203, 2006.

(56) References Cited

OTHER PUBLICATIONS

Yonggang Ke, Stuart Lindsay, Yung Chang, Yan Liu, and Hao Yan. Self-assembled water-soluble nucleic acid probe tiles for label-free RNA hybridization assays. *Science*, 319:180-183, 2008.

Yuerui Lu, Sarunya Bangsaruntip, Xinran Wang, Li Zhang, Yoshio Nishi, and Hongjie Dai. DNA functionalization of carbon nanotubes for ultrathin atomic layer deposition of high $k$ dielectrics for nanotube transistors with 60 mv/decade switching. *J. Am. Chem. Soc.*, 128(11):3518-3519, 2006.

Esther S. Jeng, Paul W. Barone, John D. Nelson, and Michael S. Strano. Hybridization kinetics and thermodynamics of DNA adsorbed to individually dispersed single-walled carbon nanotubes. *Small*, 3(9):1602-1609, 2007.

Yi Chen, Haipeng Liu, Tao Ye, Junghwa Kim, and Chengde Mao. DNA-directed assembly of single-wall carbon nanotubes. *J. Am. Chem. Soc.*, 129(28):8696-8697, 2007.

Y. Li, X. Han, and Z. Deng. Grafting single-walled carbon nanotubes with highly hybridizable DNA sequences: Potential building blocks for DNA-programmed material assembly. *Angewandte Chemie International Edition*, 46:7481-7484, 2007.

Eung-Soo Hwang, Chengfan Cao, Sanghyun Hong, Hye-Jin Jung, Chang-Yong Cha, Jae-Boong Choi, Young-Jin Kim, and Seunghyun Baik. The DNA hybridization assay using single-walled carbon nanotubes as ultrasensitive, long-term optical labels. *Nanotechnology*, 17:3442-3445, 2006.

Bernard Yurke, Andrew J. Turberfield, Allen P. Mills, Jr., Friedrich C. Simmel, and Jennifer L. Nuemann. A DNA-fuelled molecular machine made of DNA. *Nature*, 406:605-608, 2000.

Nadrian C. Seeman. De novo design of sequences for nucleic acid structural engineering. *Journal of Biomolecular Structure & Dynamics*, 8(3):573-581, 1990.

Stephanie R. Vogel, Manfred M. Kappes, Frank Hennrich, and Clemens Richert. An unexpected new optimum in the structure space of DNA solubilizing singlewalled carbon nanotubes. *Chem. Eur. J.*, 13:1815-1820, 2007.

Bernie Yurke and A.P. Mills Jr. Using DNA to power nanostructures. *Genet. Program Evolvable Mach.*, 4:111-122, 2003.

Igor G. Panyutin and Peggy Hsieh. Kinetics of spontaneous DNA branch migration. *Proc. Nat. Acad. Sci. USA*, 91:2021-2025, 1994.

U. Christensen, N. Jacobsen, V. K. Rajwanshi, J. Wengel, and T. Koch. Stopped-flow kinetics of locked nucleic acid (LNA)—oligonucleotide duplex formation: studies of LNA-DNA and DNA-DNA interactions. *Biochemical Journal*, 354:481-484, 2001.

Rebecca Schulman and Erik Winfree. Synthesis of crystals with a programmable kinetic barrier to nucleation. *Proc. Nat. Acad. Sci. USA*, 104:15236-15241, 2007.

Robert D. Barish, Rebecca Schulman, Paul W.K. Rothemund, and Erik Winfree. An information-bearing seed for nucleating algorithmic self-assembly. *To appear in Proceedings of the National Academy of Sciences*, 2009.

Patrick O'Neill, Paul W. K. Rothemund, Ashish Kumar, and D. Kuchnir Fygenson. Sturdier DNA nanotubes via ligation. *Nano Letters*, pp. 1379-1383, 2006.

B. Gao, A. Komnik, R. Egger, D.C. Glattli, and A. Bechtold. Evidence for Luttinger-liquid behavior in crossed metallic single-wall nanotubes. *Physical Review Letters*, 92(21):216804-1-216804-4, 2004.

M.S. Fuhrer, J. Nygard, L. Shih, M. Forero, Y.-G. Yoon, M.S.C. Mazzoni, Y.H.J. Choi, J. Ihm, S.G. Louie, A. Zettl, and Paul L. McEuen. Crossed nanotubes junctions. *Science*, 288:494-497, 2000.

A. Bachtold, M. S. Fuhrer, S. Plyasunov, M. Forero, Erik H. Anderson, A. Zettl, and Paul L. McEuen. Scanned probe microscopy of electronic transport in carbon nanotubes. *Physical Review Letters*, 84(26):6082-6085, 2000.

Henk W. Ch. Postma, Mark de Jonge, Zhen Yao, and Cees Dekker. Electrical transport through carbon nanotube junctions created by mechanical manipulation. *Phys. Rev. B*, 62(16):R10653-R10656, Oct. 2000.

M. Ahlskog, R. Tarkiainen, L. Roschier, and P. Hakonen. Single-electron transistor made of two crossing multiwalled carbon nanotubes and its noise properties. *Journal of Applied Physics*, 77(24):40-37-4039, 2000.

J. W. Park and Jinhee Kim K.-H. Yoo. Electrical transport through crossed carbon nanotube junctions. *Journal of Applied Physics*, 93(7):4191-4193, 2003.

D.S. Lee, J. Svensson, S.W. Lee, Y.W. Park YW, and E.E.B. Campbell. Fabrication of crossed junctions of semiconducting and metallic carbon nanotubes: A CNT-gated CNT-FET. *Journal of Nanoscience and Nanotechnology*, 6(5):1325-1330, 2006.

Anton Kuzyk, Bernard Yurke, J. Jussi Toppari, Veikko Linko, and Paivi Torma. Dielectrophoretic trapping of DNA origami. *Small*, 4(4):447-450, 2008.

Thomas Rueckes, Kyoungha Kim, Ernesto Joselevich, Greg Y. Tseng, Chin-Li Cheung, and Charles M. Lieber. Carbon nanotube-based nonvolatile random access memory for molecular computing. *Science*, 289(5476):94-97, 2000.

Adrian Bachtold, Peter Hadley, Takeshi Nakanishi, and Cees Dekker. Logic circuits with carbon nanotube transistors. *Science*, 294(9):1317-1320, Nov. 2001.

Zhaohui Zhong, Deli Wang, Yi Cui, Marc W. Bockrath, and Charles M. Lieber. Nanowire crossbar arrays as address decoders for integrated nanosystems. *Science*, 302:1377-1379, 2003.

X. Tu, S Manohar, A. Jagota, M. Zheng, "DNA sequence motifs for structure-specific recognition and separation of carbon nanotubes", *Nature*, 460, 250-253 (2009).

T-J. Fu and N. Seeman, "DNA double-crossover molecules." *Biochemistry*, 32, 3211 (1993)].

E. Winfree, N. C. Seeman, et al.,"Design and self-assembly of two-dimensional DNA crystals." *Nature*, 394, 539544 (1998)].

Faisal A. Aldaye, Alison L. Palmer, Hanadi F. Sleiman1 "Assembling Materials with DNA as the Guide" Science vol. 321 Sep. 26, 2008, pp. 1795-1799.

Nadrian C. Seeman "An Overview of Structural DNA Nanotechnology" Mol Biotechnol (2007) 37:246-257.

K. Mizuno, J. Ishii, H. Kishida, Y. Hayamizu, S. Yasuda, D.N. Futaba, M. Yumura, and K. Hata. A black body absorber from vertically aligned single-walled carbon nanotubes. *PNAS*, 106: 6044-7, 2009.

G.S. Tulevski, J. Hannon, A. Afzali, Z. Chen, P. Avouris, and C.R. Kagan. Chemically Assisted Directed Assembly of Carbon Nanotubes for the Fabrication of Large-Scale Device Arrays. *J. Am. Chem. Soc.* 129, 11964-11968, 2007.

Final Office Action issued for U.S. Appl. No. 12/540,052, filed Aug. 12, 2009 and mailed on Feb. 6, 2012.

Saiki, R.K. et al. "Genetic analysis of amplified DNA with immobilized sequence-specific oligonucleotide probes" Proc. Natl. Acad. Sci. USA, vol. 86, pp. 6230-6234 (Aug. 1989).

Advisory Action issued for U.S. Appl. No. 12/540,052, filed Aug. 12, 2009 and mailed on Aug. 6, 2012.

Advisory Action issued for U.S. Appl. No. 12/540,052, filed Aug. 12, 2009 and mailed on Apr. 8, 2013.

Non-Final Office Action issued for U.S. Appl. No. 12/540,052, filed Aug. 12, 2009 and mailed on Jun. 26, 2013.

Yao, G. et al. "Molecular-beacon-based array for sensitive DNA analysis" Analytical Biochemistry, vol. 331, pp. 216-223 (2004).

Kimura-Suda, H. et al. "Base-dependent Competitive Adsoprtion of Single-Stranded DNA on Gold". JACS, vol. 125, pp. 9014-9015 (2003).

Storhoff, J.J. et al. "Sequence-Dependent Stability of DNA-Modified Gold Nanoparticles" Langmuir, vol. 18, pp. 6666-6670 (2002).

Warren, C.L. et al. "Defining the sequence-recognition profile of DNA-binding molecules" *PNAS*, vol. 103 (4), pp. 867-872 (Jan. 24, 2006).

Archived image of DNA Design Toolbox, http://www.dna.caltech.edu/DNAdesign/, from Aug. 6, 2013.

Wikipedia. "Chemisorption" Jul. 17, 2009. Web <http://en.wikipedia.org/wiki/Chemisorption>.

Nielsen, PE. "Targeting Double Stranded DNA with Peptide Nucleic Acid (PNA)." Current Medicinal Chemistry, 2001, 8, 545-550.

Gu, H. et al. "Fabrication of Free-standing, Conductive, and Transparent Carbon Nanotube Films" *Advanced Materials* 2008, 20, 4433-4437.

(56) References Cited

OTHER PUBLICATIONS

Final Office Action mailed on Nov. 19, 2013 for U.S. Appl. No. 12/540,052, filed Aug. 12, 2009 in the name of Hareem T. Maune.

Colin D. Bain, et al., "Formation of Monolayers by the Coadsorption of Thiols on Gold: Variation in the Head Group, Tail Group, and Solvent", J. Am. Chem. Soc., 1989, 111, pp. 7155-7164.

H. Hakkinen, "The gold—sulfur interface at the nanoscale", Nature Chemistry, 2012, vol. 4: pp. 443-455.

Physisorption, Wikipedia definition retrieved on May 18, 2014 from https://web.archive.org/web/20071205140454/http://en.wikipedia.org/wi., (Wayback machine).

Non-Final Office Action issued for U.S. Appl. No. 12/540,052, filed Aug. 12, 2009 in the name of Hareem T. Maune et al. mail date: Sep. 30, 2014.

Yang, J., et al. *Stabilization of Pt nanoparticles by single stranded DNA and the binary assembly of Au and Pt nanoparticles without hybridization*. Journal of Nanoparticle Research, vol. 8, pp. 1017-1026. 2006.

\* cited by examiner

NANOCOMPOSITE STRUCTURES AND RELATED METHODS AND SYSTEMS

CROSS REFERENCE TO RELATED APPLICATIONS

This application claims priority to U.S. provisional application Ser. No. 61/188,854 filed on Aug. 13, 2008 entitled "Self Assembly of Carbon Nanotube Devices Directed by Two Dimensional DNA Nanostructures", U.S. provisional application Ser. No. 61/189,792 filed on Aug. 22, 2008, entitled "Parallel Nucleic Acid Labeled Single Wall Carbon Nanotubes with Tunable Separation", and U.S. provisional application Ser. No. 61/170,564 filed on Apr. 17, 2009, entitled "Parallel Nucleic Acid Labeled Single Wall Carbon Nanotubes with Tunable Separation", each of which incorporated herein by reference in its entirety. This application might also be related to U.S. application entitled "Polynucleotides And Related Nanoassemblies, Structures, Arrangements, Methods And Systems" filed on Aug. 12, 2009, application Ser. No. 12/540,052 herein also incorporated by reference in its entirety.

STATEMENT OF GOVERNMENT GRANT

The U.S. Government has certain rights in this invention pursuant to Grant No. CTS0608889 awarded by the National Science Foundation and Grant No. N00014-05-1-0562 awarded by Office of Naval Research.

FIELD

The present disclosure relates to nanocomposite structures and related methods and systems.

BACKGROUND

Formation of precise nanocomposite structures, such as carbon nanotube structures is a challenge in nanotechnology and related applications. In particular, it is desirable to space and in particular align carbon nanotubes and other nanomaterials in a controlled and precise manner to create new and more versatile devices utilizing such nanomaterials.

Alignment methods for carbon nanotubes exist, but the ability to control the spacing between nanotubes is not well established. In particular, carbon nanotubes have been dispersed in aqueous solutions, but dispersion has not been used in connection with spacing between nanotubes.

SUMMARY

Provided herein are polynucleotides and related nanoassemblies, structures, arrangements, methods, and systems that in several embodiments provide an effective approach for parallel and controlled arrangement and organization of nanomaterials.

According to a first aspect, a linker polynucleotide configured to space a first nanomaterial from a second nanomaterial, is described. The linker polynucleotide comprises a first moiety configured to attach with the first nanomaterial, the attachment between the first moiety and the first nanomaterial having a first affinity; and a second moiety distanced from the first moiety, configured to attach with the second nanomaterial, the attachment between the second moiety and the second nanomaterial having a second affinity, the second affinity being lower than the first affinity. The linker polynucleotide further comprises a spacer adapted to define a distance between the first nanomaterial and the second nanomaterial when the first moiety is attached with the first nanomaterial and the second moiety is attached with the second nanomaterial.

According to a second aspect, a nanoassembly configured to form an array of spaced and linked nanomaterials is described. The nanoassembly comprises at least one linker polynucleotide, and a first nanomaterial. In particular, the linker polynucleotide comprises a first moiety attached to the first nanomaterial, the attachment having a first affinity; and a second moiety distanced from the first moiety, configured to attach to a second nanomaterial, the attachment having a second affinity lower than the first affinity. The linker further comprises a spacer adapted to define a distance between the first nanomaterial and the second nanomaterial when the second moiety is attached to the second nanomaterial.

According to a third aspect, an array of spaced and linked nanomaterials is described. The array comprises a plurality of nanoassemblies herein described attached one to the other through respective second moieties thereof, wherein the second moiety of one of the plurality of nanoassemblies is attached to the second moiety of another nanoassembly of the plurality of nanoassemblies.

According to a fourth aspect, a method to produce an arrangement of spaced nanomaterials is described. The method comprises providing at least two nanoassemblies herein described, providing a surface, and incubating the at least two nanoassemblies on the surface for a time and under conditions to allow self-assembly of the nanomaterials in the arrangement.

According to a fifth aspect, a composition is described. The composition comprises at least one nanoassembly herein described and a suitable vehicle or diluent.

According to a sixth aspect, a system for formation of an arrangement of nanomaterials is described. The system is a kit of parts comprising at least two nanoassemblies, a surface adapted to allow formation of the arrangement comprising the at least two nanoassemblies, and reagents suitable to allow self assembly of the nanomaterials of the nanoassemblies on the surface, the at least two nanoassemblies, the surface and the reagents adapted to be combined to allow formation of the arrangement of nanomaterials.

According to a seventh aspect, a system for formation of an arrangement of nanomaterials is described. The system is a kit of parts comprising at least two linker polynucleotides herein described, at least two nanomaterials, the at least two linker polynucleotides and the at least two nanomaterials being used to form at least two nanoassemblies, a surface, adapted to allow formation of the arrangement comprising the at least two nanoassemblies, and reagents suitable to allow self assembly of the nanomaterials of the nanoassemblies on the surface, the at least two nanoassemblies, the surface and the reagents adapted to be combined to allow formation of the arrangement of nanomaterials. In several embodiments, an aligning tool, such as electrodes to create an electrical field, a specific a substrate geometry or other tools suitable to applying a force that aligns the nanomaterial in the nanoassemblies in at least one direction, identifiable by a skilled person, can also be included in the system herein described.

Polynucleotides and related nanoassemblies, structures, arrangements, methods, and systems herein described are generally useful in the preparation of ordered nanomaterial ultrathin films, the incorporation of nanomaterials into micro, nano, and opto-electronics, the preparation of well separated nanomaterial forests for devices such as solar cells and fuel cell electrodes, highly parallel chemical sensor arrays, and nanoscale mosaics for molecular based computing. The present disclosure is advantageous in that it allows nanomaterials to be aligned with each other and positioned with such density that the separation between neighboring nanomaterials is on the order of 10 nm or less.

Polynucleotides and related nanoassemblies, structures, arrangements, methods, and systems herein described allow the nanoassemblies to self-assemble into structures where nanomaterials are kept at a precisely defined separation via the attractive and repulsive forces exerted by the linker polynucleotides. The nanomaterials are further aligned to be parallel to one another by the cooperative activity of many bridging linker polynucleotides along any pair of nanomaterials. The extra degree of control afforded by this composite leads to the possibility of building more precise engineered nanoscale structures with diverse applications.

Polynucleotides and related nanoassemblies, structures, arrangements, methods, and systems herein described offer further advantages such as the nanomaterials are kept in a water soluble and separated state in solution, and only assemble into parallel arrays on two-dimensional surfaces with select surface properties and under select solution conditions.

Polynucleotides and related nanoassemblies, structures, arrangements, methods, and systems herein described make it possible to use solubilized nanomaterials as an ink to print nanostructured parallel nanomaterial arrays on select areas of a substrate, potentially leading to low cost nanostructured substrates for nanoelectronics.

The details of one or more embodiments of the disclosure are set forth in the accompanying drawings and the detailed description and examples below. Other features, objects, and advantages will be apparent from the detailed description, examples and drawings, and from the appended claims.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

DETAILED DESCRIPTION

Figure 1:
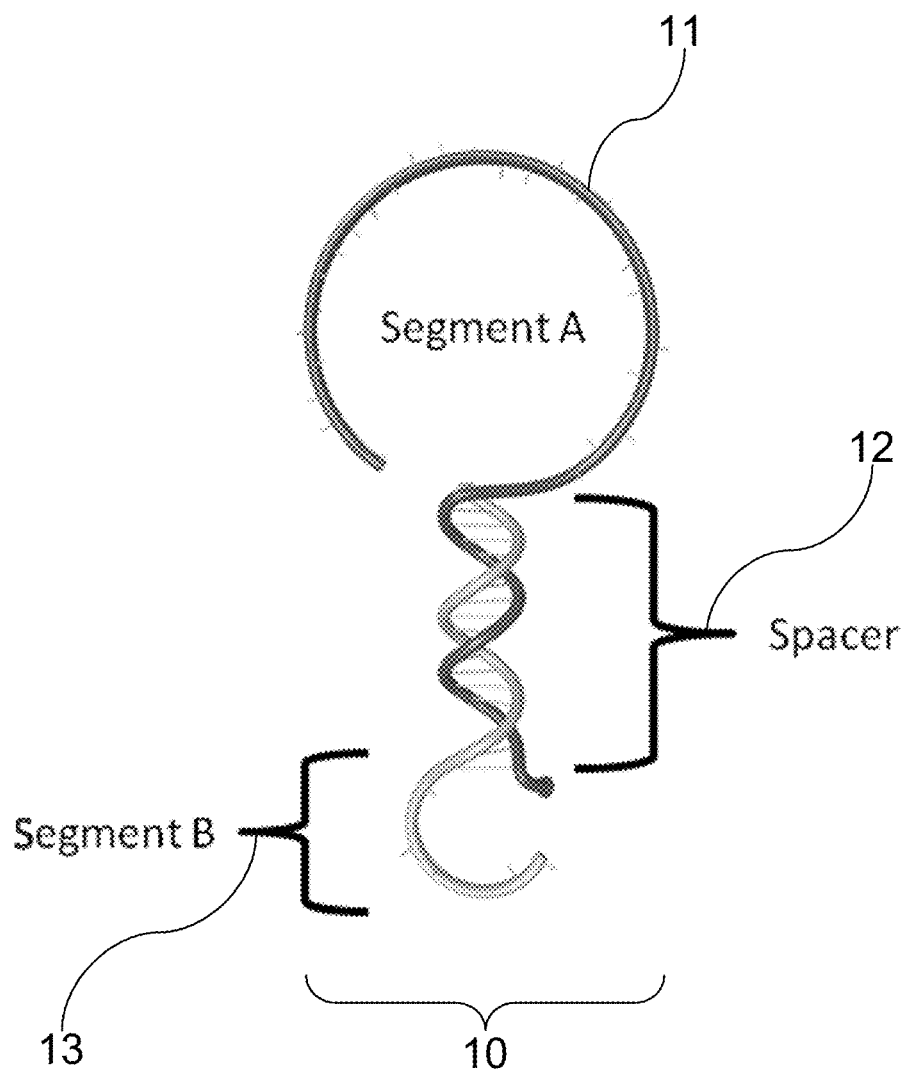
FIG. 1 show a schematic representation of a linker polynucleotide according to several embodiments. Segment A comprises a dispersal domain consisting of thymine nucleotides. Segment B comprises an association domain. The spacer is a polynucleotide duplex region in the embodiment shown.

Provided herein are polynucleotides and related nanoassemblies, structures, arrangements, methods, and systems that in several embodiments provide an effective approach for parallel and controlled arrangement and organization of nanomaterials.

The term "nanomaterial" as used herein indicates any materials used in nanotechnology and related material science applications and fields. Exemplary nanomaterials include, but are not limited to a fullerene, an inorganic nanoparticle, or related structures or derivatives. In particular, nanomaterials comprise carbon spheres, carbon nanotubes and carbon nanowires. Particular carbon nanotubes of interest comprise cylindrical single wall carbon nanotubes (SWNT) and related structures such as nanoribbons. The term "carbon nanotube" as used herein indicates carbon nanotubes and carbon nanowires. Carbon nanotubes are cylindrical single wall or multi wall carbon nanotubes and related structures such as nanoribbons. In the present description, "SWNT" refers to a carbon nanotube that is a single wall carbon nanotube.

Although in the present disclosure reference is often made to carbon nanotubes and in particular to SWNT, such a reference is made only for the purpose of illustrating the polynucleotides and related assembly arrangements methods and systems herein described and is not intended to be limiting. A skilled person will be able to adapt specific examples and illustration related to carbon nanotube to other nanomaterials of a different shape and chemical nature upon reading of the present disclosure, based on techniques and procedure known to the skilled person.

In several embodiments, a same or different nanomaterial can be spatially arranged using linker polynucleotides and related assemblies. Linker polynucleotides in the sense of the present disclosure are polynucleotides that are configured to attach a first nanomaterial of interest with a second nanomaterial of interest.

The term "polynucleotide" as used herein indicates an organic polymer composed of two or more monomers including nucleotides, nucleosides or analogs thereof. The term "nucleotide" refers to any of several compounds that consist of a ribose or deoxyribose sugar joined to a purine or pyrimidine base and to a phosphate group and that is the basic structural unit of nucleic acids. The term "nucleoside" refers to a compound (such as guanosine or adenosine) that consists of a purine or pyrimidine base combined with deoxyribose or ribose and is found especially in nucleic acids. The term "nucleotide analog" or "nucleoside analog" refers respectively to a nucleotide or nucleoside in which one or more individual atoms have been replaced with a different atom or a with a different functional group. Accordingly, the term "polynucleotide" includes nucleic acids of any length, and in particular DNA, RNA, analogs and fragments thereof. A polynucleotide of three or more nucleotides is also called "nucleotidic oligomer" or "oligonucleotide." The formation of a polynucleotide "duplex" refers to Watson-Crick base pairing to form a double-helix.

In several embodiments, linker polynucleotides and related nanoassemblies, structures, arrangements, methods, and systems allow the skilled person to separate and arrange nanomaterials in a controlled and precise manner. In particular in several embodiments, a linker polynucleotide is configured to space one nanomaterial from another nanomaterial, and more particularly the linker can be configured to space material with sub-nanometer resolution. The term "sub-nanometer resolution" as used herein refers to the ability to control the spacing between adjacent nanomaterials at distances of about equal to or less than 1 nm. In particular, linker polynucleotides herein described allow attachment and controlled spacing of nanomaterials, and the related aggregation in assemblies and arrays of various sizes, dimensions and complexities. In several embodiments, the spacing between nanomaterials can be specified to a resolution that is approximately equal to the width of a single nucleotide base pair in a double stranded polynucleotide strand (approximately 3.4 Å or 0.34 nm).

In several embodiments, the linker polynucleotide comprises a first moiety configured to attach a first nanomaterial, a second moiety configured to attach to a second nanomaterial.

The term "attach", "attached" or "attachment" as used herein, refers to connecting or uniting by a bond, link, force or tie in order to keep two or more components together, which encompasses either direct or indirect attachment such that for example where a first compound is directly bound to a second compound, and the embodiments wherein one or more intermediate compounds, and in particular molecules, are disposed between the first compound and the second compound.

The term "moiety" as used herein indicates a particular chemical substance, molecule, or molecular complex with a particular functional significance. In the present disclosure, a moiety is used to attach a linker polynucleotide with a nanomaterial. In particular, in several embodiments, the first moiety is configured to attach to the first nanomaterial with a first affinity and the second moiety is configured to attach to the second nanomaterial with a second affinity; and the first affinity is higher than the second affinity.

The term "affinity" as used herein indicates an attractive force or interaction between substances or particles that causes them to enter into and remain in chemical combination. The strength of the interaction between a first substance and a second substance can be measured with methods identifiable by a skilled person. Also a comparison between the strength of interaction between one pair of substances and another pair of substances can be performed. In particular, in cases where a detected interaction between a first pair of substances or particles is stronger than another pair, the former pair is indicated to have a higher affinity than the latter pair. Accordingly, in linker polynucleotide herein described, the first moiety, herein also dispersal domain, is configured to allow attachment of the linker polynucleotide to the nanomaterial, and the second moiety association domain is configured to allow attachment of the linker polynucleotide to the nanomaterial that is less than or equal in strength to the attachment between a nanomaterial and the dispersal domain of a linker polynucleotide to the same or other nanomaterial. In particular, the association domain has a lower affinity for a certain nanomaterial than does the dispersal domain for the same nanomaterial.

The affinity of each domain for the respective nanomaterial can be measured with methods known to the skilled person. For example, nanomaterials such as carbon nanotubes that are functionalized by chemical groups or polynucleotide molecules can be analyzed to determine the relative affinity of a first moiety for a first nanomaterial and a second moiety for a second nanomaterial. The first and second nanomaterials may be identical or different. To measure these affinities, functionalized nanomaterials are first prepared separately for the first moiety and the second moiety. Following functionalization, Raman spectroscopy is used to measure an affinity between the first moiety and the first nanomaterial. A second affinity between the second moiety and the second nanomaterial is also measured with Raman spectroscopy, the second affinity being compared to the first affinity to determine the relative affinity between the first and second moiety for their respective nanomaterial species. Parameters of analysis to aid the analyst in determining affinity between the moiety and the nanotube, which would be apparent to those skilled in the art, include radial breathing mode, D-band, and G-band [6]. In some cases, especially when either the first or second moieties are polynucleotide molecules, pre-fractionation and partially purification of the sample of functionalized nanomaterials can be performed prior to analysis with Raman spectroscopy. An exemplary suitable technique to perform the pre-fractionation and partial purification is anion exchange chromatography, which produces several fractions with partially-purified functionalized nanomaterial species [3]. When this intermediate step is executed, each fraction is then subjected to Raman spectroscopy or an equivalent technique to measure the first and second affinity. In cases when only a rough comparison between the first affinity and the second affinity needs to be measured, AFM imaging can be used to simply determine whether arrays according to several embodiments were formed with linkers comprised of the first and second moieties being analyzed.

In several embodiments, in a linker herein described a moiety can be formed in all or in part by a single or double stranded polynucleotide and in particular DNA (e.g. SEQ ID NO: 1 and SEQ ID NO: 2). In these embodiments, the polynucleotide moiety can be a contiguous extension of the one or more strands forming the polynucleotide spacer of the linker polynucleotide.

In some embodiments, in a linker herein described a moiety can comprise a chemical functional or functional group capable to interact with a corresponding functional group or molecule located or attached to the nanomaterial of interest. The term "functional group" as used herein indicates specific groups of atoms within a molecular structure that are responsible for the characteristic chemical reactions of that structure. Exemplary functional groups include hydrocarbons, groups containing halogen, groups containing oxygen, groups containing nitrogen and groups containing phosphorus and sulfur all identifiable by a skilled person. Additional functional groups can be identified by a skilled person upon reading of the present disclosure. As used herein, the term "corresponding functional group" refers to a functional group that can react with another functional group. Thus, functional groups that can react with each other can be referred to as corresponding functional groups. Exemplary pairs of functional groups and corresponding functional groups can be selected to comprise the following binding partners: carboxylic acid group and amine group, azide and acetylene groups, azide and triarylphosphine group, sulfonyl azide and thio acid, and aldehyde and primary amine, and additional pairs of functional groups identifiable by a skilled person upon reading of the present disclosure.

In some embodiments, the linker and/or nanomaterial to be attached to the linker can be functionalized. The terms "functionalize" and "functionalization" as used herein, indicates the appropriate chemical modifications of a molecular structure (including a substrate or a compound) resulting in attachment of a functional group to the molecular structure.

In some embodiments, in a linker herein described the moiety can be formed by a molecule or fragment thereof, possibly comprising a functional group, which is able to interact with a corresponding moiety presented on the nanomaterial to be attached. Exemplary pair of corresponding moieties either of which can be included in the linker or in the nanomaterial to be attached comprise ligand-receptor, biotin-streptavidin and antigen-antibody (or a functional fragment thereof). Numerous pairs of molecules exist in the art for this purpose and those suitable for the purpose of binding a polynucleotide spacer to a carbon nanotube will be identifiable to those skilled in the art. In these embodiments, the moiety located on the linker can be covalently bound to the spacer (e.g. presented on the polynucleotide linker as a whole) or non-covalently bound to the spacer, (e.g. interacting with the spacer through electrostatic interactions).

In some embodiments, for example, a linker polynucleotide can have a first moiety that is a biotin molecule and can be attached to a first nanomaterial that has been functionalized or otherwise coated with streptavidin molecules, the attachment occurring between the biotin and the streptavidin. Other schemes using a similar pair of functional groups will be apparent to those skilled in the art.

Linker polynucleotides herein described also include a spacer adapted to define a distance between a first nanomaterial and the second nanomaterial when the first moiety is attached with the first nanomaterial and the second moiety is attached with the second nanomaterial.

In several embodiments, the spacer comprises a polynucleotide duplex region configured to allow separation between a first and a second nanomaterial, the separation distance being controlled by the length of the polynucleotide duplex. In other embodiments, the spacer comprises a polynucleotide tile or crossover structure, (see e.g. FIG. 14B and FIG. 15C). In these embodiments, the separation distance is controlled by the overall length of the tile or crossover structure. The polynucleotide tile or crossover structure can be formed by a combination of polynucleotides comprising more than one type of nucleic acid (DNA and LNA, for example), or it can be entirely composed of one type of nucleic acid such as DNA.

In several embodiments, where the dispersal domain is formed by a polynucleotide, the polynucleotide forming the dispersal domain has a length and/or sequence composition that is suitable for attachment to a nanomaterial of interest. In particular, in those embodiments, the length and sequence of the dispersal domain in view of the nanomaterial to be attached. For example, for embodiments where the nanomaterial is formed by carbon nanotubes, a dispersal domain formed by a polynucleotide can vary in length (approximately 10 to 100 nucleotide chain), and/or can have a specific sequence for selection of different chiralities of nanotubes. In embodiments where the nanomaterial to be attached is a nanomaterial other than nanotubes, the dispersal domain can be a polynucleotide which hybridizes to a corresponding polynucleotide attached to the nanomaterial and/or a functional group or molecule presented at the end of a short polynucleotide section which chemically interacts with a corresponding functional group or molecule presented on the nanomaterial.

In some embodiments, the dispersal domain can be a 30 or 40 nucleotide poly-thymine stretch. In some embodiments, the dispersal domain can be a more complex sequence including particular sequence patterns such as internal repeat structures. The dispersal domain typically does not contain sequences that are complementary to the duplex region of the spacer. The dispersal domain is often single stranded but can also be double stranded.

In several embodiments, an association domain comprises a polynucleotide sequence composition suitable for association with a nanomaterial of interest. In several embodiments, the length of the association domain is equal to or shorter than the length of the dispersal domain. A suitable range for the length of the association domain is 1 to 15 nucleotides. In several embodiments, where the association domain is formed by DNA, the polynucleotide length is approximately 7 nucleotides. The length of the association domain can vary and be shorter or longer, depending on the type of nucleic acid used. For example, when LNAs are used, an association domain of shorter length can be effectively employed compared to when DNA is used. The physical and chemical characteristics of the association domain should ensure that the association domain cannot attach to a nanomaterial alone.

In several embodiments, a linker polynucleotide is formed by a double-stranded, partially-duplex polynucleotide complex with a poly-thymine (poly-T) dispersal domain, a spacer, and an association domain such as the one exemplified in FIG. 1. In particular, FIG. 1 illustrates a schematized DNA linker polynucleotide (10). The linker polynucleotide consists of two strands forming the structure illustrated via Watson-Crick base pairing. The first moiety segment A (11) is a single stranded DNA area of variable length (20 to 60 nucleotides. The second moiety segment B (13) is a single stranded DNA area of variable length less than or equal to the length of the first moiety segment A (11) (typically 1-15 nucleotides). The spacer (12) is a double stranded DNA region formed by Watson-Crick base pairing between the strand (indicated with dark gray color in FIG. 1-4) bearing segment A (11) and the strand (indicated with light gray color in FIG. 1-4) bearing segment B (13). The spacer can vary in length from 10 to 200 base pairs. The minimum length of the spacer is set by the energetic stability of a DNA duplex under processing conditions. Thus, at lower temperature and higher salt concentration, where DNA helices are more stable, the spacer can be shorter than 10 base pairs. Thus, the spacer provides control of distance down to an integer number of nucleotides. If DNA is replaced with an energetically more favorable synthetic nucleotide, such as a "peptide nucleic acid" (PNA) or "locked nucleic acid" (LNA), the spacer could be even shorter.

The term "locked nucleic acids" (LNA) as used herein indicates a modified RNA nucleotide. The ribose moiety of an LNA nucleotide is modified with an extra bridge connecting the 2' and 4' carbons. The bridge "locks" the ribose in the 3'-endo structural conformation, which is often found in the A-form of DNA or RNA. LNA nucleotides can be mixed with DNA or RNA nucleotides in the oligonucleotide whenever desired. The locked ribose conformation enhances base stacking and backbone pre-organization. This significantly increases the thermal stability (melting temperature) of oligonucleotides.

The term "peptide nucleic acids" (PNA) as used herein indicates an artificially synthesized polymer, whose backbone is composed of repeating N-(2-aminoethyl)-glycine units linked by peptide bonds. The various purine and pyrimidine bases are linked to the backbone by methylene carbonyl bonds. PNA has the advantage of forming polynucleotide triplex structures, being able to recognize and hybridize to specific sequences within a polynucleotide duplex region such as a DNA duplex of several linker embodiments.

Additional examples of linker polynucleotides and related configurations assemblies and arrangements are illustrated in FIG. 7, FIG. 9, FIG. 10, FIG. 11, FIG. 12, FIG. 13, and FIG. 14. Exemplary procedures for making and using linker polynucleotides are exemplified in Examples 1, 2, 5, and 6 which detail the design and formation of several linker polynucleotides according to several embodiments.

Figure 13:
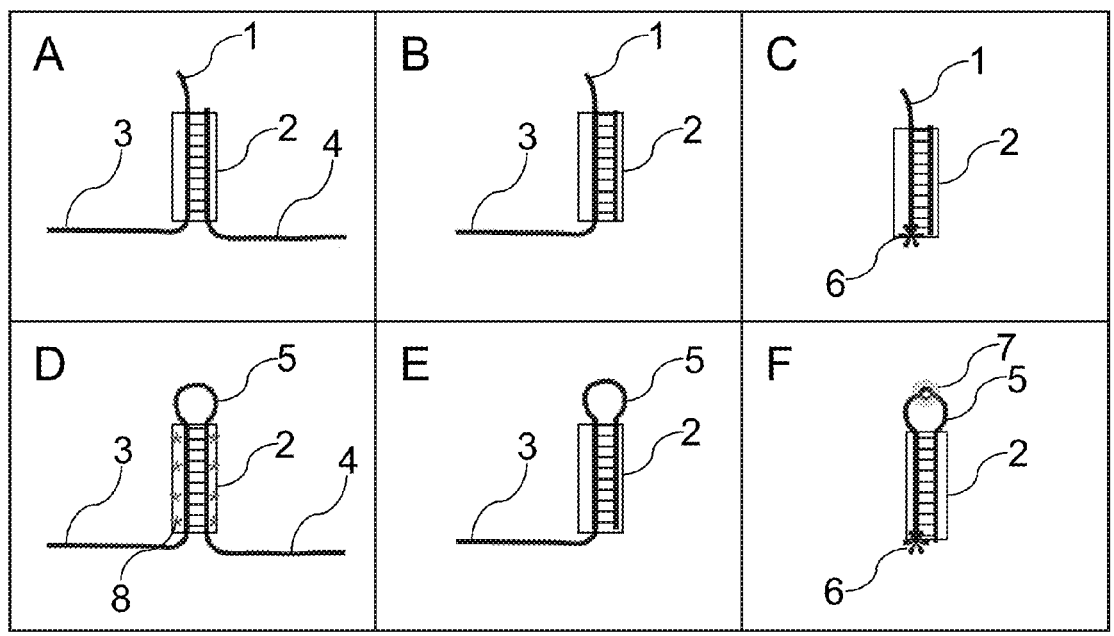
FIG. 13 shows different schematics of linker polynucleotide variants. Panels A, B, and C show polynucleotide linkers comprised of 2 strands. Panels D, E, and F show polynucleotide linkers comprised of 1 strand. Panel C shows a DNA linker where the attachment to the nanomaterials is accomplished via a chemical linker moiety. Panel D shows a linker where the duplex region has additional chemical modifications such as poly ethylene glycol side chains to prevent binding to the nanomaterials.

In particular, several exemplary embodiments of linker polynucleotides are schematically illustrated in FIG. 13. In all panels, segment (1) is an association domain, segment (2) is a duplex region acting as a spacer, and segments (3) (alone in some panels) and (4) are collectively the dispersal domain. In particular, FIGS. 13A, B, and C illustrate a polynucleotide linker comprised of partially double stranded polynucleotide segments.

Figure 14:
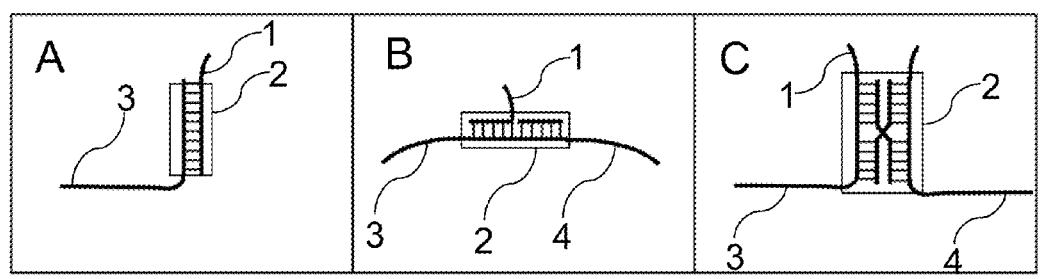
FIG. 14 shows different schematics of linker polynucleotide variants. Panels A shows a linker polynucleotide comprised of 2 strands. Panels B shows linker polynucleotides comprised of 3 strands. Panel C shows a polynucleotide linkers that use a two helix DNA crossover structure as the spacer.

Additional exemplary embodiments of linker polynucleotides are schematically illustrated in FIG. 14. In all panels, segment (1) is an association domain, segment (2) is a duplex region acting as a spacer and segments (3) (alone in some panels) and (4) are collectively the dispersal domain. In particular, FIGS. 14A, B, and C illustrate a polynucleotide linker comprised of partially double stranded polynucleotide segments. FIG. 14B depicts a linker that uses the width of the double stranded polynucleotide segment to control spacing between neighboring nanomaterials. In some of those embodiments, it can be desirable that segment (1) points away from the nanostructure bound to segments (3) and (4) according to the experimental design.

In particular, in embodiments, where a single double stranded nucleotide segment is used as the spacer, segment (4) can be located at the opposite side of the polynucleotide duplex as the dispersal segments if a spacing matching the length of the linker spacer domain is desired. In embodiments, where tiles or crossover structures are used, the association segment and spacing can be located on the duplex furthest from the dispersal segments if a distance between the nanomaterials matching the spacer domain of the tile structure is desired. FIG. 14C depicts a linker that uses a polynucleotide structure with two or more parallel helices held together by one or more tiles or crossover motifs as the spacer. Compared to spacers consisting of a single duplex segment, these structures are usually more resistant to bending forces under a same condition.

In several embodiments, the duplexes of each polynucleotide of the cross-over structure can be arranged parallel to each other, in side by side, tubular, or space filling loosely or closely packed configurations, as is desirable for the specific application. In particular, the configuration exemplified in the schematic illustration of FIG. 14B can also use polynucleotide tiles or crossover structures as spacers. In those embodiments, structures formed oriented parallel to the nanomaterials instead of orthogonal. In several embodiments, linkers can have more than one dispersal domain and more than one association domain.

In some embodiments, the linker polynucleotide can be a single polymer, or a multipolymer complex. In embodiments where the linker polynucleotide is provided by a complex, the complex can be covalently cross-linked after linker polynucleotide formation. For example, the DNA duplex could be modified with a UV cross-linking base and exposed to UV light after the linker polynucleotide is formed.

In some embodiments, the linker polynucleotide can be formed by a double stranded polynucleotide or a single stranded polynucleotide molecule wherein a duplex region comprising the spacer is formed between complementary bases on the single stranded polynucleotide molecule. Reference is made to the schematic illustration of FIGS. 13D, E, and F. As shown in the illustration of FIG. 13D, E, and in such embodiments, the single stranded polynucleotide molecule forms a hairpin (segment (5) of FIGS. 13D, E, and F), and the loop of the hairpin presents several nucleotide bases suitable for interaction with surfaces such as nanomaterial sidewalls. Thus, in those embodiments the hairpin serves the function of an association domain. Additionally, because a hairpin is energetically more stable than a duplex comprised of two separate strands, in embodiments where the linker is formed by a hairpin the duplex region (2) could be as short as 5 base pairs. Synthetic bases such as LNA can be inserted into region (2) to increase stability and further reduce the length of the duplex region. In particular FIG. 13D shows a linker where the duplex region (2) has additional chemical modifications ((8); denoted with "*") such as poly ethylene glycol side chains to prevent binding to the nanomaterials.

In some embodiments, a single stranded polynucleotide molecule with a duplex and a hairpin structure can be adapted to present a functional group or moiety on one or both sides of the linker. For example, FIG. 13F provides a schematic representation of a configuration where a functional group or a molecule able to bind a corresponding functional group or molecule is illustrated. In this embodiment, one chemical moiety is presented on the hairpin structure and the other is presented on one of the single stranded ends of the molecule. Item (6) of FIGS. 13C and F, and items (6) and (7) of FIG. 13F schematically are chemical moieties, such as functional groups or molecule able to specifically bind corresponding functional groups or molecules, for attaching the linker polynucleotide to the nanomaterial as described above.

In several embodiments, a nanoassembly is provided. The nanoassembly is configured to form an array of spaced and linked nanomaterials. The nanoassembly comprises (i) the linker polynucleotide herein described and (ii) a nanomaterial wherein the linker polynucleotide is attached to the nanomaterial through the first moiety of the linker polynucleotide. In some embodiments, the nanoassembly is formed by non-covalent attachment of a nanomaterial to a polynucleotide linker.

In several embodiments, the first moiety of the linker polynucleotide can be formed by a dispersal domain formed by a polynucleotide single or double strand. The noncovalent attachment between the dispersal domain and the nanomaterial can be formed, for example, when single-stranded DNAs (ssDNAs) such as a poly-T dispersal domain of a polynucleotide linker structure is sonicated in the presence of nanomaterials such as carbon nanotubes. This process is associated with noncovalent attachment of the polynucleotide to the nanomaterial via physisorption of polynucleotide bases to nanomaterial sidewalls [3] and causes the nanomaterials to disperse [2] in aqueous solution.

The term "dispersal", or "dispersed" as used herein with reference to a process or method to attach a linker to nanomaterials indicates the result whereby nanomaterials or related structures are solubilized in aqueous solution. In particular, in several embodiments, dispersal of nanotubes using linker polynucleotides can be achieved. For example, a linker polynucleotide herein described and a carbon nanotube can be brought together in solution and upon sonication of the solution, the linker polynucleotide absorbs onto the nanotube resulting in "dispersal" of the nanotube-linker polynucleotide complex.

In particular, in several embodiments, the non covalent attachment via physisorption allows noncovalent attachment of polynucleotide labels to nanomaterials without disrupting their electronic properties [4] and provides a simple route to polynucleotide linker-nanomaterial structures. An exemplary method for assembling and purifying a linker polynucleotide with a nanomaterial is illustrated in Examples 2 and 3.

Figure 2:
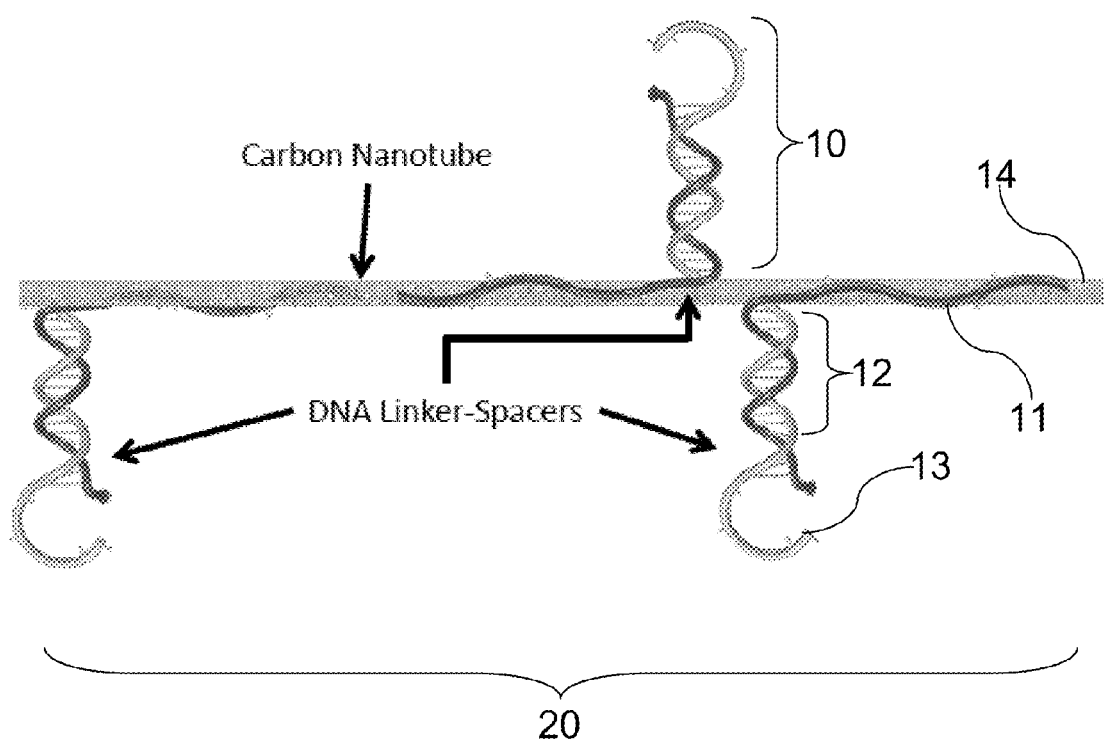
FIG. 2 shows a schematic representation of a nanoassembly according to several embodiments.

FIG. 2 illustrates a nanoassembly formed by a nanomaterial and a linker polynucleotide according to several embodiments. In the illustration of FIG. 2, segment A (11) is the dispersal domain that absorbs on the sidewall of a carbon nanotube and disperses the carbon nanotube, producing the structure (20) depicted in FIG. 2. In the illustration of FIG. 2, segment B (13), is the association domain, (see also FIG. 1) designed to associate with the sidewall of a neighboring carbon nanotube (which is typically also dispersed) with lower affinity than for segment A (11). In embodiments, exemplified by the illustration of FIG. 2, the association domain (13) is usually much shorter than dispersal domain (11) (1 to 15 nucleotides for single wall carbon nanotubes) so that the association domain cannot stably bind to the nanotube sidewall on its own. In several of those embodiments, the association domain (13) from many different linker polynucleotides must work cooperatively to bind a nanotube. In the configuration exemplified by the schematic illustration of FIG. 2, the double stranded DNA spacer cannot absorb on the sidewall of the carbon nanotube bound to dispersal domain (11) or the carbon nanotube bound to the association domain (13). Thus, embodiments presenting this configuration, the double stranded polynucleotide acts as a spacer keeping two neighboring carbon nanotubes separated. Several configurations can be envisaged considering the mechanical properties of the polynucleotide of choice used for the spacer. For example double stranded DNA is rigid up to approximately 50 nm. Accordingly when double stranded spacer formed by DNA are used, and lengths greater than 50 nm with same resistance are desired, are desirable a simple dsDNA spacer can be replaced by constructs such as polynucleotide tiles or crossover structures.

Figure 15:
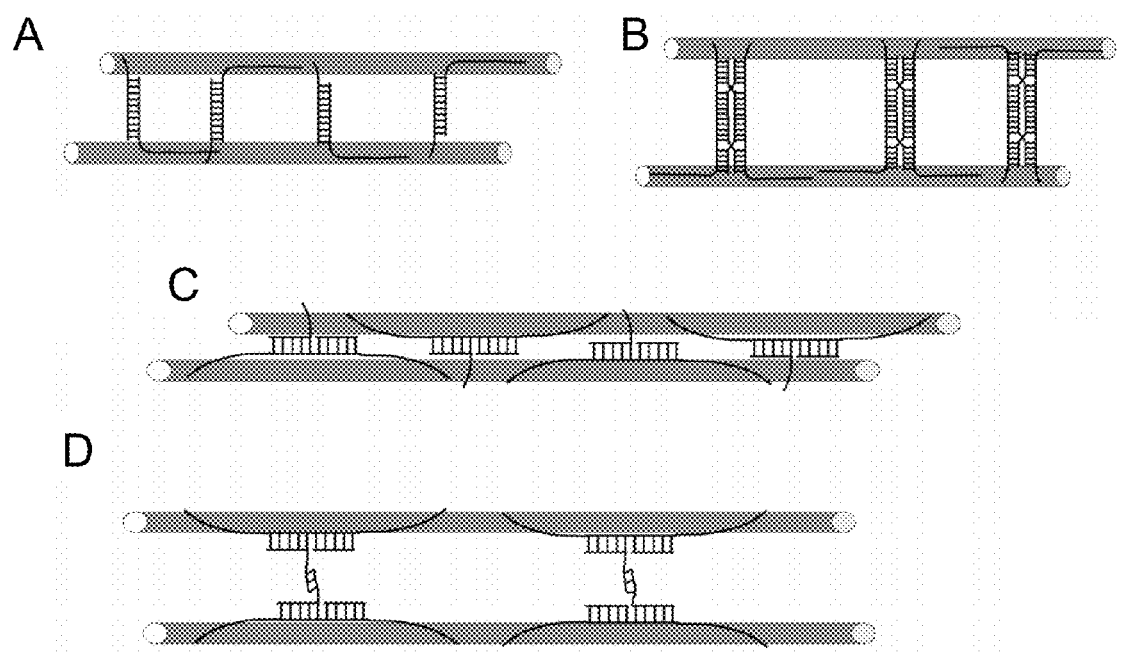
FIG. 15 shows a schematic representation of nanoassembly variants according to several embodiments. Panel A shows a schematic of a nanoassembly formed using the linker from FIG. 14A. Panel B shows a schematic of a nanoassembly using a linker of the type depicted in FIG. 14C. This linker has 2 crossover segments instead of 1. Panel C shows a schematic of a nanoassembly using the linker from FIG. 14B. Panel D shows a schematic of a nanoassembly where the association region on linkers of neighboring carbon nanotubes weakly base pair with each other (~3-5 base pairs).

FIG. 15 illustrates exemplary nanoassemblies according to several embodiments. In particular, FIG. 15A illustrates two neighboring carbon nanotubes held together by a linker of the type depicted in FIG. 14A. FIG. 15B depicts neighboring carbon nanotubes held together by a linker that incorporates a DNA crossover structure as the spacer. FIG. 15C depicts nanoassemblies comprising the linkers shown in FIG. 14B. Configurations of the linker such as the one exemplified by the schematic illustration of FIG. 14B allows the nanomaterials to be spaced as close as the distance allowed by the width of the spacer instead of the length and can therefore be desirable in certain experimental design given the width of a usual polynucleotide duplex is ~2 nm to 3 nm. FIG. 15D depicts a nanoassembly wherein the association domains on linkers, base pair with each other. This configuration can be advantageous in cases where assembly in solution is desired between two or more different nanomaterials that have respectively been attached with two different polynucleotide linkers.

In the embodiments schematically illustrated in FIG. 15, the two nanomaterials are first attached with their respective linkers and then simply mixed. In some of those embodiments, the base pairing between association segments are kept weak (ideally approximately 3-6 base pairs), to ensure cooperative association of several linkers on two different nanomaterials. In those embodiments, once linkers of having a same spacer cooperatively link to the nanomaterial, the two nanomaterials align in a substantially parallel configuration. In particular, the configuration of the linkers and the conditions are selected sot that free linkers in solution cannot stably bind and compete with binding between nanomaterials. Nanomaterials in these embodiments achieve linker cooperativity when have a suitable alignment among each other.

In several embodiments it is necessary or desirable to apply an aligning force or other means to control and in particular increase an ordered alignment and arrangement of nanoassemblies during formation of an array. Applying an aligning force can be accomplished in a variety of ways that are known in the art some of which discussed in [7] incorporated herein by reference in its entirety. In particular, during array formation such as on a surface according to several embodiments, a vacuum filtration method can be used to aid in aligning nanomaterials during array formation. Alternatively, certain variants of a controlled flocculation process can be useful. In other embodiments, shear forces associated with fluid flows can contribute to aiding alignment on nanomaterials. Electric or magnetic fields are also used in the art to align nanomaterials, as is mechanical shear. Nanomaterial ordering can also be achieved using convective flow of nanomaterials or nanoassemblies to a liquid-solid-air contact line in particular casting processes. Further, laminar flow of gases and anisotropic interactions between nanomaterials and crystalline substrates can also be used to apply an alignment tool, mechanism, or force during formation of an array according to several embodiments. Other alignment techniques known to those with skill in the art can also be used during formation of arrays according to several embodiments.

FIG. 2 illustrates a nanoassembly after dispersal using the linker polynucleotide. The linker polynucleotides adsorb randomly on SWNTs via their dispersal domains (11), the spacer regions and the association domains (13) point away from the SWNT. Association domains (13) can also dynamically adsorb on and desorb from the nanotube sidewall.

In several embodiments, an arrangement of nanomaterials is provided. The arrangement comprises a plurality of nanoassemblies herein described arranged in an array. In particular, the is formed such that the nanoassemblies are arranged on a surface and are parallel with each other and attached to each other through the polynucleotide linkers, wherein the linker polynucleotide is bound to a first nanoassembly of the structure through its dispersal domain, bound to a second, adjacent nanoassembly of the structure through its association domain, and wherein the spacer of the linker polynucleotide spaces and links adjacent nanoassemblies of the structure.

Figure 3:
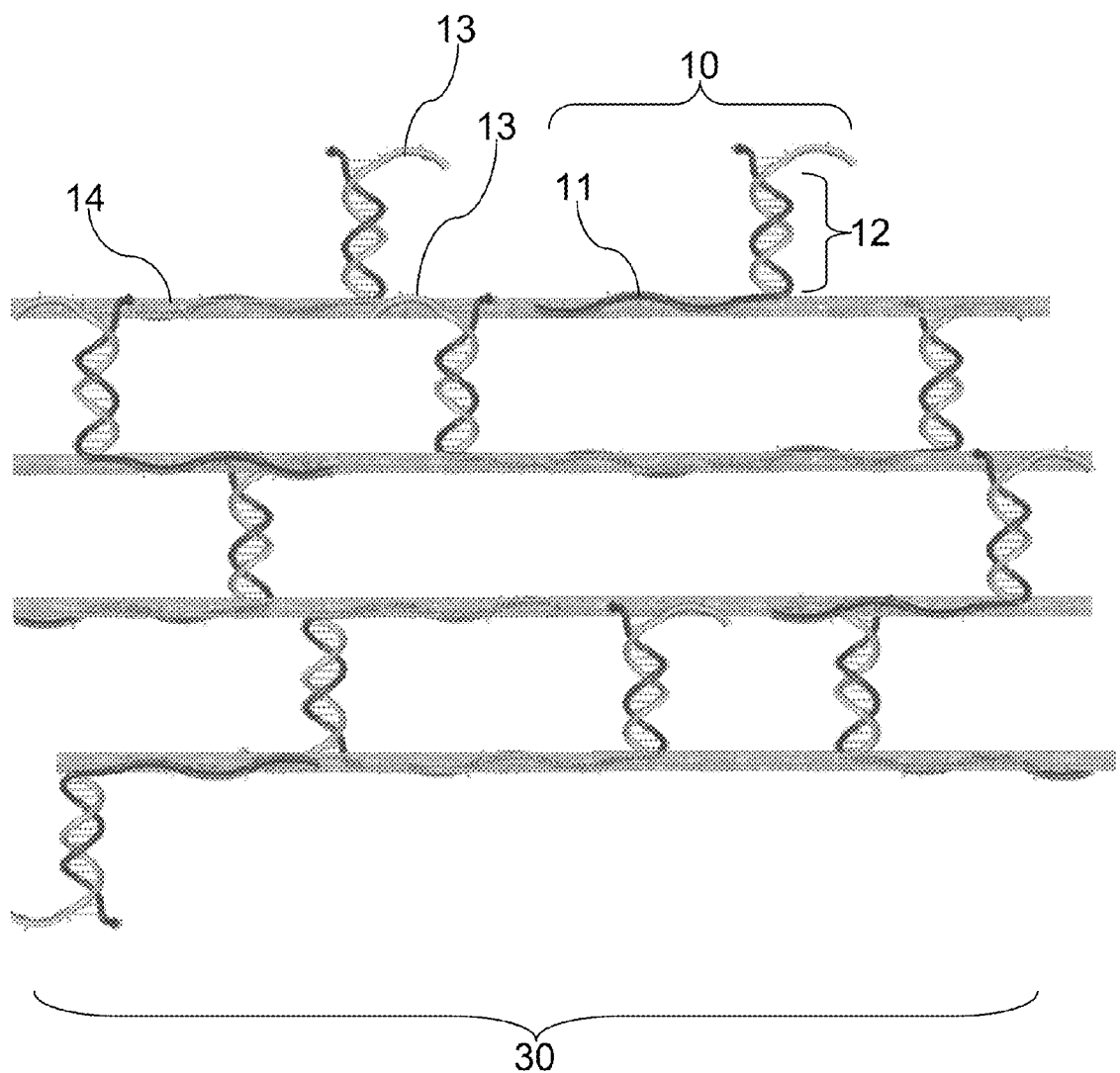
FIG. 3 shows a schematic representation two-dimensional array of nanoassemblies according to several embodiments.

FIG. 3 shows a schematic of an array of parallel single wall carbon nanotubes (30) kept at fixed separation by the linker polynucleotide (10). The linker polynucleotides are arranged randomly along the nanotube axis but act collectively to keep the nanotube aligned and separated. In the schematic illustration of FIG. 3, carbon nanotubes are prevented from coming closer than the distance defined by the spacers because the spacers resist compression and bending. In particular, in this illustration carbon nanotubes are kept from moving further away than the distance allowed by the spacer because the spacer resists stretching, and because the nanotubes are adhered to the single stranded polynucleotide segments. Further, in the arrangement exemplified by the schematic illustration of FIG. 3 the shorter "B" segments, association domains (13) can now stably associate with neighboring carbon nanotubes because many spacers are acting collectively to stabilize the entire structure.

Figure 4A:
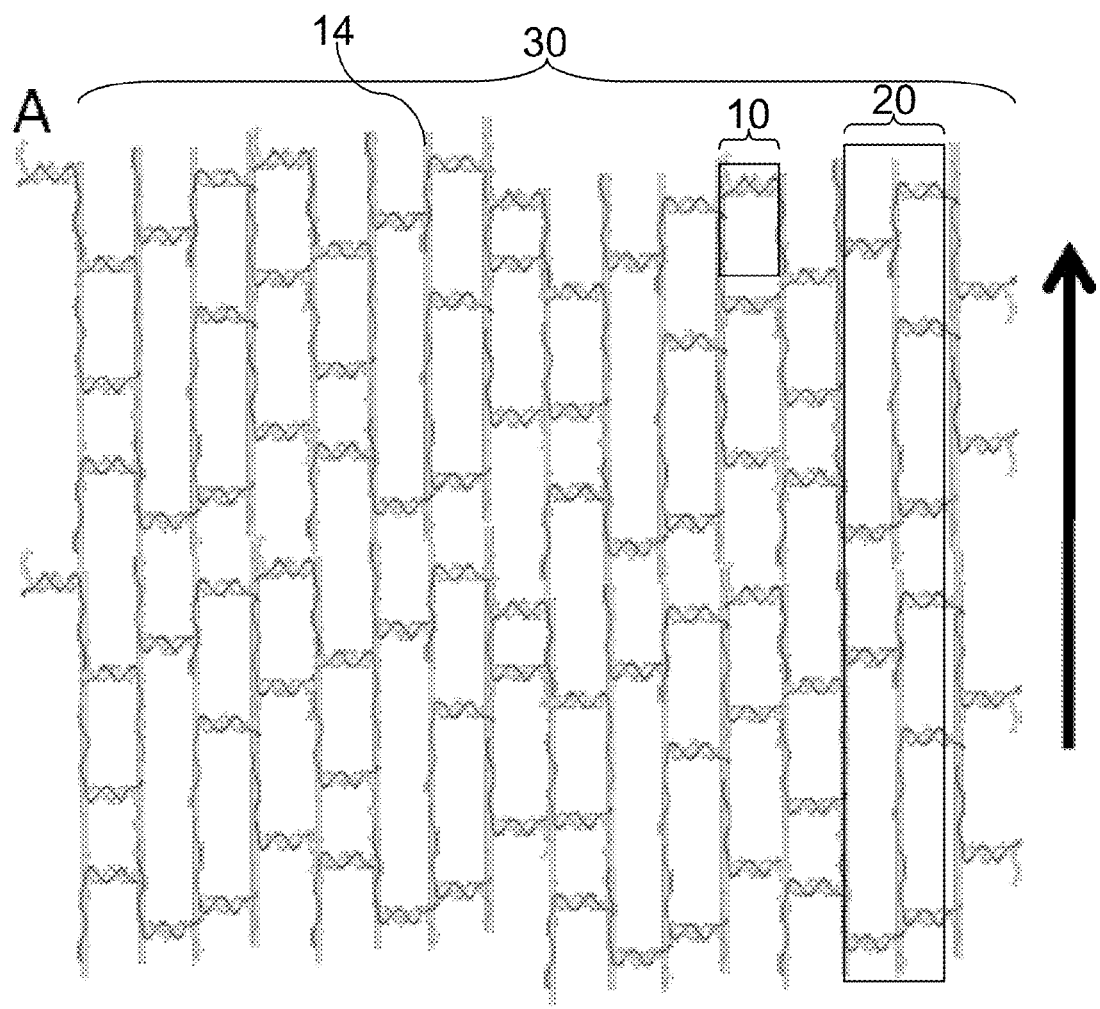
FIG. 4 shows a schematic representation of proposed applications of several embodiments. Panel A shows a schematic representation of an array of single wall carbon nanotubes on a substrate. The arrow indicates the direction of a large scale alignment force. Panel B shows a schematic representation of a silicon wafer. The dark area has surface properties that prevent sticking of linker polynucleotide modified carbon nanotubes. The white areas have surface properties compatible with sticking of the carbon nanotubes. Arrays of parallel carbon nanotubes can form on the white areas. Panel C shows four pictures of a single walled carbon nanotube forests taken at four different scales. The upper left panel shows a carbon nanotube forest on a silicon wafer. The top right panel is an SET image of a vertically standing carbon nanotube forest. Scale bar is 0.5 mm. The bottom left panel and bottom right panel are SEM images showing the top and sides of the forest. Scale bars are 5 µm. Panel D is a schematic representation of a diagram of a carbon nanotube forest after it has been dispersed using linker polynucleotides in situ. The left panel is a three-dimensional view, and the right panel is a top down view of the forest.

FIG. 4A shows a similar schematic of an array of carbon nanotubes on a surface or substrate. The arrow indicates the direction of a large scale alignment force such as fluid flow, drag, or an electric field, which can be required to form such arrays (discussed below). Example 4 details an exemplary protocol for formation of an array as described herein.

The array is two-dimensional because it is deposited on a surface in several embodiments (described below), the surface providing electrostatic interactions and mechanical support that allows, in the presence of particular solution conditions, the array to form. For example, FIG. 4B (discussed below) shows a schematic of a nanotube array deposited on a silicon wafer. Other embodiments, discussed below, allow for a three-dimensional array to form. Two-dimensional arrays of several embodiments are typically arranged with nanotubes parallel to one another; however, arrays can be formed where the nanotubes are not exactly parallel.

In some embodiments, the array can be a three-dimensional array of nanoassemblies herein described. In particular, the array is arranged such that the nanoassemblies are arranged in three-dimensional space and are parallel with each other and bound to each other through the polynucleotide linkers, wherein the linker polynucleotide is bound to a first nanoassembly through its dispersal domain and bound to a second, adjacent nanoassembly through its association domain.

In some of these embodiments, where carbon nanotubes are the nanomaterials, the carbon nanotubes can first be arranged into a "forest". A carbon nanotube "forest" refers to an arrangement of nanotubes where many nanotubes are roughly parallel to each other and where a single, common end of each nanotube is embedded, fixed, or immobilized in a matrix. This arrangement is often disordered with respect to distance between adjacent nanotubes. The addition of linker polynucleotides of several embodiments can organize the nanotube forest into a three-dimensional array of nanotubes. This arrangement is a common result of chemical vapor deposition growth of carbon nanotubes from a suitable catalyst seeded substrate.

Figure 4B:
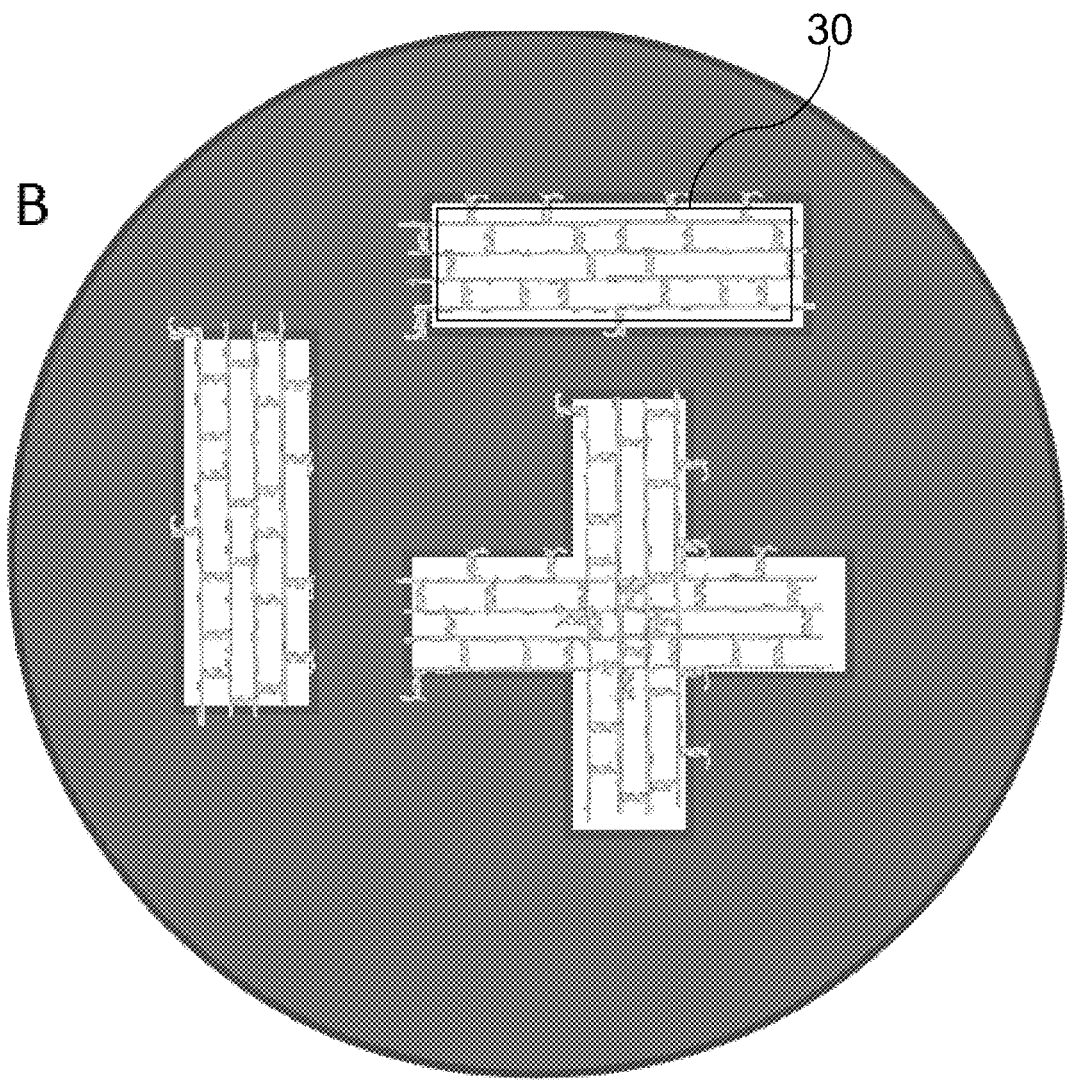
Figure 4C:
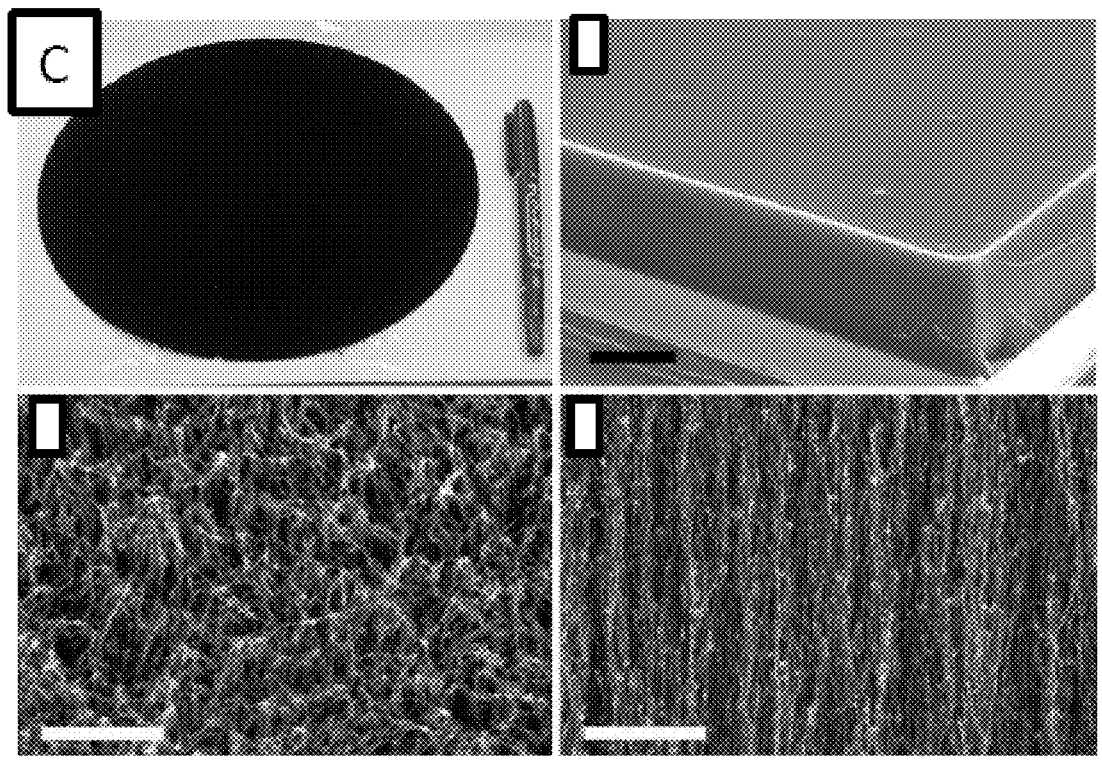
Figure 4D:
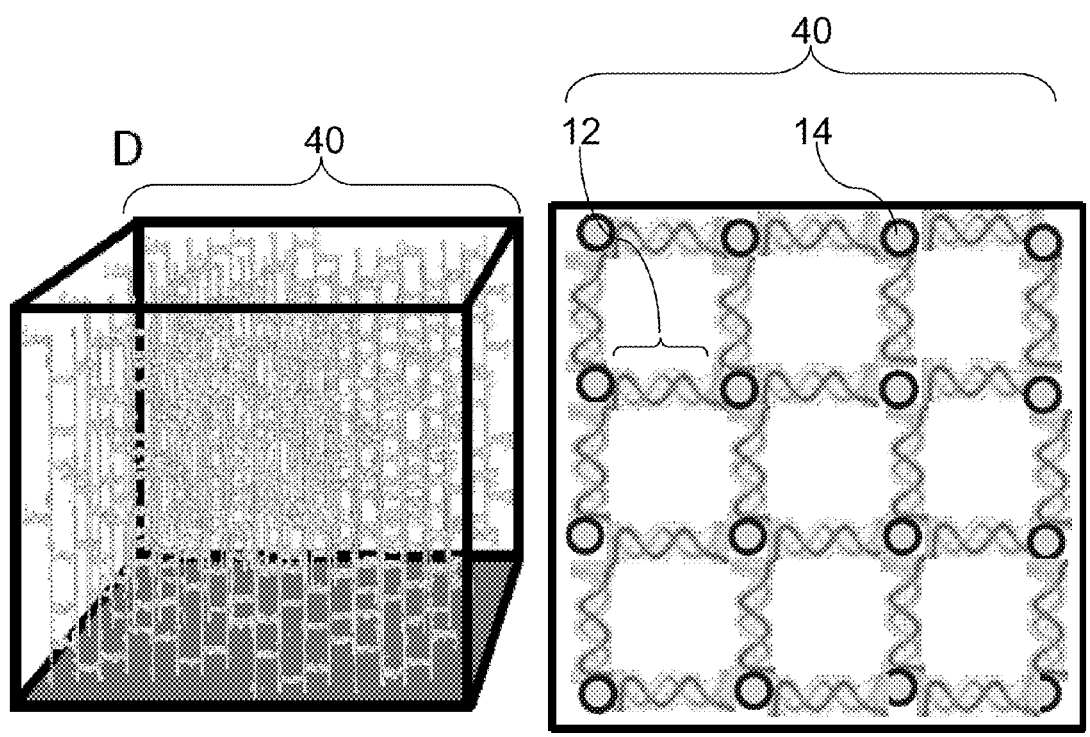

In particular, FIG. 4D shows a schematic of a three-dimensional array of parallel nanoassemblies. FIG. 4D shows a SWNT forest after it has been dispersed using DNA linker polynucleotides in situ, thus producing a three-dimensional array of parallel nanoassemblies. FIG. 4D, left panel is the 3-D view, and FIG. 4D, right panel is a top down view.

Four pictures of single walled carbon nanotube forests taken at four different scales, derived from [5] are shown in FIG. 4C. FIG. 4C, upper left panel shows a SWNT forest on a silicon wafer. FIG. 4C, upper right panel is a scanning electron micrograph (SEM) of a vertically standing SWNT forest. Scale bar is 0.5 mm. FIG. 4C, bottom left panel and FIG. 4C, bottom right panel are (scanning electron micrograph) SEM images showing the top and sides of the forest. Scale bars are 5 µm.

Polynucleotides and related nanoassemblies, structures, arrangements methods and systems can be used in several embodiments to precisely position and align nanomaterials labeled with specific polynucleotide sequences onto specific template patterns of different shapes and forms including but not limited to origami and ribbon shaped polynucleotidic structures.

Exemplary, polynucleotidic templates include but are not limited to 2D structures e.g. DNA origami, DNA ribbons, nanoscale polyhedra. Some of these structures are known and have been also used to organize nanoparticles or proteins, and self-assemble 1D electronic devices.

In several embodiments, polynucleotidic template can take the form of ribbons. Polynucleotidic ribbons are comprised of multiple units/tiles each formed by two long strand and two short strands arranged in a tile shaped structure such as the one illustrated in Example 11 of related application, U.S. patent application Ser. No. 12/540,052 filed on Aug. 12, 2009. In particular, DNA ribbons are one of the most robust forms of algorithmic self-assembly and are made using double crossover (DX) molecules/tiles as their main component. The DX molecules/tiles are made of four or five ssDNA conformed in a four arm junction that forms the basic structure (see [61] and [62]). Many different kinds of tiles can be manufactured on the basis of this basic structure and are used in structural DNA nanotechnology applications. Those additional structures are identifiable by a skilled person and are all comprised in the scope of the present disclosure.

In several embodiments, multiple populations of NL-SWNTs with different properties (semiconducting or conducting, length-sorted, or chemically modified) could be labeled with different sequences, and self-assemble simultaneously into a complex device geometry defined by the layout of lines on an origami or ribbon platform.

In several embodiments, a method of producing an array of nanoassemblies is described. The method comprises forming a nanoassembly according to several embodiments, followed by depositing the nanoassemblies onto a surface for a time and under conditions to allow for self-assembly of the nanoassemblies into an array of nanoassemblies according to several embodiments. Suitable surfaces include but are not limited to silicon, mica, flexible polymer sheets, and glass surfaces and additional surfaces identifiable by a skilled person. Various salt solutions are employed to allow particular forms of self-assembly of nanoassemblies into a two-dimensional array.

The term "solution" as used herein indicates any liquid phase sample containing molecules of interest. For example, an aqueous solution of linker polynucleotides can comprise nanoassemblies diluted in water or a buffered solution.

In several embodiments, the method comprises dispersing nanomaterials with linker polynucleotides according to several embodiments. The dispersing is carried out in a compatible solution (e.g. aqueous sodium or $Mg^{2+}$ salt solutions for DNA linker polynucleotides). The dispersal domain of the linker polynucleotides attach to the carbon nanotube noncovalently and separate individual carbon nanotubes. A suitable smooth (as close to atomically smooth as possible) substrate is introduced. The substrate can be silicon, mica, flexible polymer sheets, glass, and a variety of other substrates suitable as substrates for electronic or opto-electronic devices, which would be apparent to a skilled person.

In other embodiments, carbon nanotubes can be deposited on lithographically patterned surfaces. For example, a silicon surface can be functionalized with a monolayer of uncharged silanes. Bare $SiO_2$ strips can be exposed to oxygen plasma treatment. The carbon nanotube arrays will then only form and deposit on the exposed strips. The aspect ratio of the strips will determine the alignment of the carbon nanotube arrays.

In several embodiments, conditions, using appropriate solutions, are created so that the polynucleotide-nanoassembly complexes associate with the surface but can diffuse on the surface in two-dimensions. Additionally, polynucleotide-nanoassembly complexes can also have a rate of desorption into the solution and re-adsorption from the solution.

In several embodiments, during this process, the linker polynucleotides allow carbon nanotubes to associate with each other in the parallel direction in solution and on the two-dimensional surface. When this happens, the association domains on the carbon nanotubes form bridging links, with the spacers keeping the adjacent carbon nanotubes at a fixed distance. (In the case where no association domain is present, the spacer only separates the carbon nanotubes). Because the association domains have low affinity to other carbon nanotubes, the linker polynucleotides strongly discourage formation of complexes other than parallel carbon nanotubes (e.g., they rarely form random tangles).

Additionally in several embodiments, during the process summarized above, the nanoassemblies associate on the surface and in solution. The rate of association is higher on the surface due to reduced dimensionality.

Furthermore, in several embodiments during the same process, larger complexes consisting of more carbon nanotubes in parallel adsorb more strongly to the surface than smaller complexes or small single carbon nanotubes. This creates parallel carbon nanotube arrays with high efficiency. In the case where linker polynucleotides do not have association domains, crowding on the two-dimensional surface leads to packing arrangement favoring parallel carbon nanotubes separated by the spacer of the linker polynucleotide. The spacer sets the distance between adjacent carbon nanotubes. More carbon nanotubes can be progressively added in aliquots. The process is stopped by removing the deposition solution and changing substrate conditions to disallow two-dimensional diffusion and desorption. If small species are to be retained, the conditions can be changed before the deposition solution is removed, thereby bringing down all species in the solution onto the surface. Otherwise, the deposition solution should be removed first to remove individual carbon nanotubes.

Figure 5:
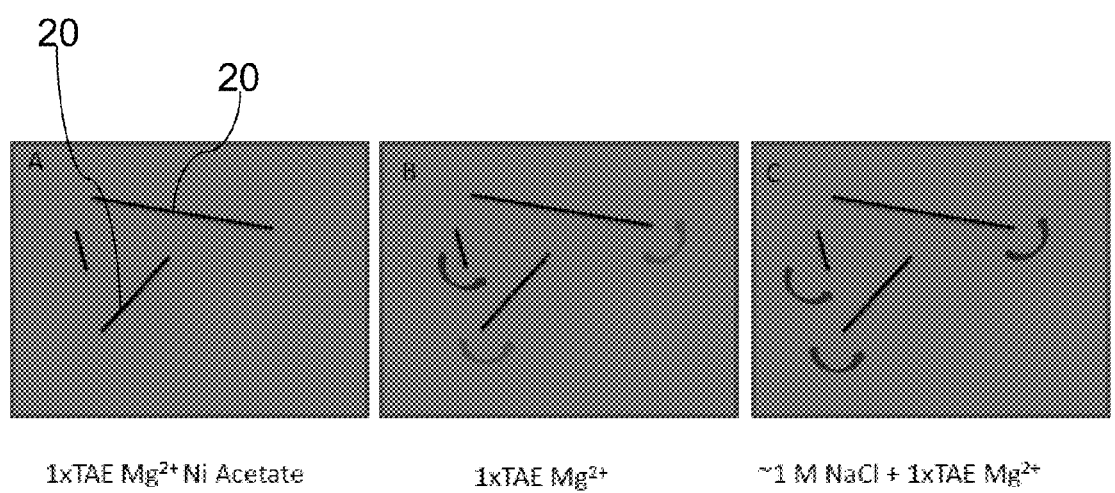
FIG. 5 shows several schematics of nanoassemblies on a mica surface under various solution conditions. In Panel A the solution contains ~12.5 mM $Mg^{2+}$, ~10 mM $Ni^{2+}$, and ~1 mM EDTA (metal ion chelator). In Panel B the solution contains ~12.5 mM $Mg^{2+}$, and ~1 mM EDTA. In Panel C ~1 M NaCl is added.

The steps of the above method are illustrated in FIG. 5. In particular, the schematics in FIG. 5 show what happens when an aqueous solution of nanoassemblies are placed on a mica surface under various solution conditions. In the embodiments exemplified in FIG. 5 both the mica surface and the modified carbon nanotubes have dense negative charges. In FIG. 5A, the solution contains ~12.5 mM $Mg^{2+}$, ~10 mM $Ni^{2+}$, and ~1 mM EDTA (metal ion chelator). These conditions result in the $Mg^{2+}$ and $Ni^{2+}$ acting as highly stable salt bridges between the negative charges on the mica surface and negative charges on the linker polynucleotide backbone. Other solutions of bivalent cations are suitable for this purpose and will be apparent to the skilled person. The modified nanotubes are adhered on the surface and are stationary. In FIG. 5B, without $Ni^{2+}$, the salt bridges are less stable. Shorter carbon nanotubes are able to diffuse along the surface. When ~1 M $Na^+$ is added in FIG. 5C, the monovalent ion destabilizes salt bridges further. The nanotubes still associate with the surface, but now all nanotubes can move. These nanotubes then diffuse until meeting other nanotubes, at which point the linker polynucleotides lead to the formation of parallel arrays. Larger arrays tend to be less mobile on the surface. Other similar salt solutions will function for this purposes described herein and will be apparent to a person skilled in the art.

FIG. 4A shows a schematic of an array of single wall carbon nanotubes on a substrate formed by the method of several disclosed embodiments. The arrow indicates the direction of a large scale alignment force such as fluid flow, drag, or an electric field. An alignment force creates a macroscale preference in the direction of alignment and is optional. An aligning force works from the top down while the linker polynucleotides work from the bottom up to align carbon nanotubes at the nanoscale and set their separation.

FIG. 4B shows a schematic of arrays of carbon nanotubes on a silicon wafer. The dark areas are inert and have surface properties that prevent adherence of nanoassemblies. The white areas have surface properties compatible with deposition and adherence of the carbon nanotubes. According to several embodiments, arrays of parallel carbon nanotubes form on the white areas. The aspect ratio of the shape of the area gives carbon nanotubes with the right length a preferred orientation. This orientation is then propagated to the self assembled carbon nanotube array. The cross area has two arrays of carbon nanotubes with a cross bar structure forming in the middle. The linker polynucleotides define the separation and align the nanotubes with one another. Using this approach, it is possible to control the position, size and orientation of the arrays, and the spacing of carbon nanotubes within the array. It is also possible to create more complex structures such as the crossbar.

In several embodiments, a method of producing a three-dimensional array of parallel nanoassemblies is provided. The method comprises providing a nanomaterial forest with one side of the nanomaterial forest held immobile in a suitable matrix or metal, followed by forming nanoassemblies according to several embodiments, the nanoassemblies being arranged in a three-dimensional array of parallel nanoassemblies.

FIGS. 4C-D schematically illustrate the in situ dispersal of SWNT forests and formation of a three-dimensional array of parallel nanoassemblies according to several embodiments. FIG. 4C shows typical examples of SWNT forests. In embodiments exemplified in FIG. 4 the SWNTs in the forest stick to each other via van der Waals interactions and are entangled. In several embodiments, the average spacing of the carbon nanotubes is much less dense, ranging from 1 per 10 nm×10 nm or less. This is typically seen at the roots of the forests. FIG. 4D shows a schematic demonstrating what can happen when the forest is sonicated in a solution of linker polynucleotides in situ. The dispersed carbon nanotubes are able to remain in a forest like configuration due to linker polynucleotides bridging neighboring carbon nanotubes, even if disentangled and separated, and kept at a fixed distance. A higher degree of disorder among nanotubes than the one indicated in the schematic illustration of FIG. 4 is possible.

According to a several embodiments, a composition is provided. The composition comprises nanoassemblies combined with a suitable vehicle, carrier, or diluent. In several embodiments, the composition comprises an ink for printing parallel carbon nanotube films.

The term "diluent" or "vehicle" as used herein indicates a diluting agent which is issued to dilute or carry an active ingredient of a composition.

In several embodiments, a system for formation of an arrangement of nanomaterials is described. The system can be provided as a kit of parts, wherein the system comprises at least two nanoassemblies according herein described and a surface as described herein. The surface is adapted to allow formation of the arrangement comprising the at least two nanoassemblies. In the kit of parts, reagents are provided that allow for self assembly of the nanomaterials of the nanoassemblies. Reagents can include solutions such as those including $Ni^{2+}$ acetate, bivalent cations such as $Mg^{2+}$, and/or NaCl as described above and in the examples. Arrays of nanoassemblies would be formed according to methods disclosed herein.

In other embodiments, the kit of parts comprises at least two linker polynucleotides herein described and at least two nanomaterials. These and related embodiments are for formation of the nanoassemblies by the user followed by formation of an array of nanoassemblies of several embodiments.

The system also comprises a surface adapted to allow formation of the arrangement comprising the at least two nanoassemblies. In embodiments of the system, the surface can be used as is or it can be treated, for example, with silanes to allow for formation of arrays. In the kit of parts, reagents are provided that allow for self assembly of the nanomaterials of the nanoassemblies. Reagents can include solutions such as those including $Ni^{2+}$ acetate, bivalent cations such as $Mg^{2+}$, and/or NaCl as described above and in the examples. In these embodiments, nanoassemblies would first be formed according to methods disclosed herein, followed by production of arrays of nanoassemblies according to methods disclosed herein.

Additional components of the system or kit of parts can also be included and comprise microfluidic chip, reference standards, buffers, and additional components identifiable by a skilled person upon reading of the present disclosure.

In the kit of parts herein disclosed, the components of the kit can be provided, with suitable instructions and other necessary reagents, in order to perform the methods herein disclosed. In some embodiments, the kit can contain the compositions in separate containers. Instructions, for example written or audio instructions, on paper or electronic support such as tapes or CD-ROMs, for carrying out the assay, can also be included in the kit. The kit can also contain, depending on the particular method used, other packaged reagents and materials (such as wash buffers and the like).

EXAMPLES

The structures, methods, and system herein described are further illustrated in the following examples, which are provided by way of illustration and are not intended to be limiting.

Example 1

Design and Formation of a Linker Polynucleotide

Figure 6:
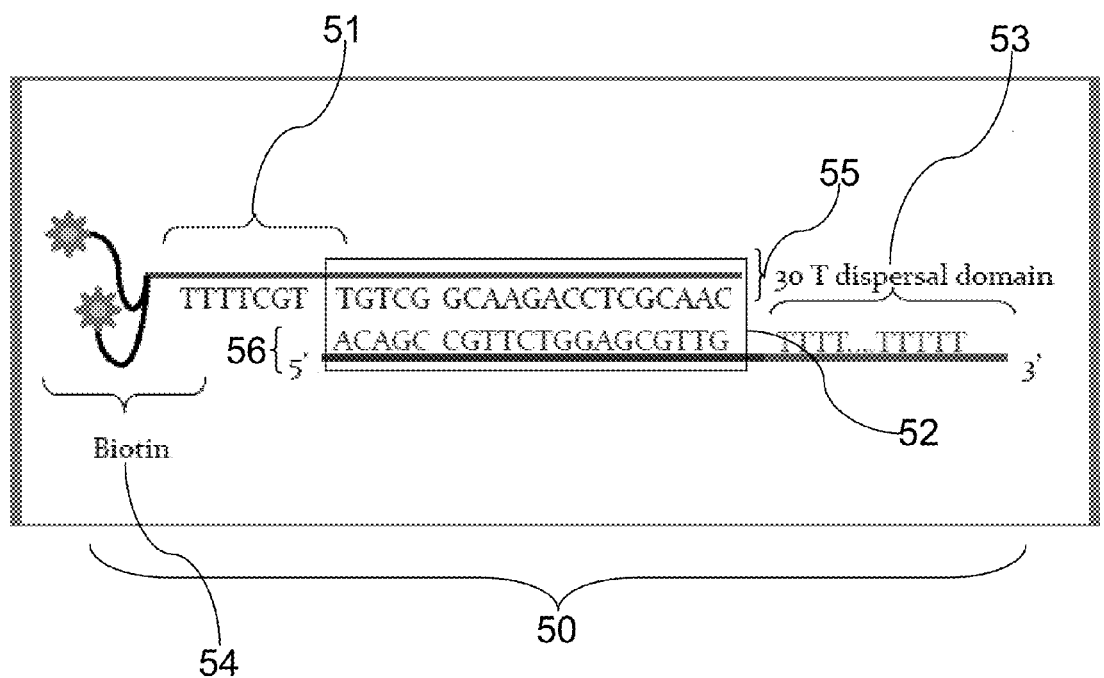
FIG. 6 shows a schematic representation of the sequence composition and related structure of a linker polynucleotide according to an embodiment. The linker has a dispersal domain consisting of 30 thymine nucleotides, a 7 nucleotide association domain sequence, and a spacer that is 20 base pairs long. The linker polynucleotide also has a biotin modification at the 5' end of one polynucleotide strand.

Linker polynucleotides of the type illustrated in FIG. 1 (10) were designed according to the illustration of FIG. 6. FIG. 6 shows the sequence composition of an exemplary linker polynucleotide (50). In the present example, the dispersal domain (53) consists of 30 thymine nucleotides: 5'-TTTTTTTTTTTTTTTTTTTTTTTTTTTTTT-3' (SEQ ID NO. 1). The association domain (51) consists of the sequence 5'-TTTTCGT-3' (SEQ ID NO. 2). The spacer (52) is 20 bp long and has the sequence shown. The linker polynucleotide also has a biotin modification at the 5' end of Segment B (13), which is for labeling purposes and is not essential.

To produce a linker polynucleotide, oligos were purchased in lyophilized form from IDT DNA. Sequences of the oligos are shown in FIG. 6. The association domain-containing strand (55) sequence 5'-CAACGCTCCAGAACGGCTGT-TGCTTTT-3' (SEQ ID NO: 3) and the dispersal domain containing strand (56) sequence 5'-ACAGCCGTTCTG-GAGCGT-TGTTTTTTTTTTTTTTTTTTTTTTTTTTTTTT-3' (SEQ ID NO: 4) were computer-optimized [1] to minimize sequence complementarity, homology, and melting temperature differences with programs written in MATLAB available at http://www.dna.caltech.edu/DNAdesign/.

The strands of the previous paragraph were separately dissolved in water purified by a Milli-Q unit (Millipore) to form stock solutions at ~300 µM. A 2 M NaCl stock solution is created and filtered using 0.22 µm filters. For the complex of linker polynucleotide (50), the strands (55, 56) are mixed with NaCl stock solution and Milli-Q purified water to obtain 600 µL of dispersal solution with ~33 µM of strand (55), ~36 µM of strand (56), and 0.1 M NaCl; the concentrations the strand (55) and strand (56) were chosen to give a 10% excess of protection strand. This solution is put in a 0.6 mL PCR tube and annealed in an Eppendorf Mastercycler from 95° C. to 20° C. at 1° C. per minute. The protection strand/main strand partial duplex has a melting temperature $T_{melting}$ ~50° C. in our buffers.

The resulting linker polynucleotide (50) is a two-stranded, partially-duplex complex that adsorbs onto a SWNT via a 40-base poly-thymine (poly-T) dispersal domain (53). Its 20 nucleotide spacer (52) has a length that allows for precise separation distance between adjacent carbon nanotubes in a nanotube array (30). The spacer sequences are 5'-CAACGCTCCAGAACGGCTGT-3' (SEQ ID NO. 5) and the complementary sequence 5'-ACAGCCGTTCTG-GAGCGTTG-3' (SEQ ID NO. 6).

Example 2

Dispersal and Functionalization of Carbon Nanotubes with Linker Polynucleotide Spacers In particular, to create nanoassemblies of FIG. 2, 0.1 mg of dry HiPco SWNTs were added to 250-500 µL of a dispersal solution containing 1×TAE $Mg^{2+}$ and ~32 µM concentration of DNA linker polynucleotides in a 1.7 mL PCR tube. The tube is then placed in an ice-water bath and sonicated for ~90 min in a Branson 2510 sonicator (100 W). The water level inside the sonication chamber and the position of the PCR tube is adjusted to apply maximum sonication power to the sample. The temperature of the water bath is maintained at ~15° C. The SWNTs are sonicated until the solution turns a uniform gray color and all the SWNTs are completely solubilized. The solution is then centrifuged at 16,000 g for 90 min at 15° C. Following this step, the supernatant is retained while the insoluble condensate is discarded. This process yields a high concentration of well-dispersed NL-SWNTs as determined by AFM and TEM images.

After dispersal, the concentration of excess free linkers (which could poison later assembly) was reduced by electrodialysis, and monitored by spectrophotometry or gel electrophoresis as illustrated in Example 3.

Example 3

Removal of Excess Free Linker Polynucleotide from a Preparation of Carbon Nanotubes Dispersed with Linker Polynucleotides with a 20 Spacer The dispersal procedure for creating NL-SWNTs of Example 2 leaves a large excess of free linker polynucleotide complexes in solution that was reduced before self-assembly.

In particular, electrodialysis was applied using a Harvard Apparatus Electroprep system. A 500 µL Teflon fast dialysis tube is filled with NL-SWNT solution and capped at both ends with 50 kD MWCO cellulose ester dialysis membranes. The dialysis tube is then placed in the Electroprep tank. The tank was filled with 0.1 M $Na_2HPO_4$ buffer (filtered with a 0.22 µm membrane).

A constant current of 15 to 20 mA is applied across the electrodes of the Electroprep tank. The current was run for two hours. The electrodes were then disconnected and the tank was washed. Fresh buffer is added, the direction of the dialysis tube is reversed such that the membrane facing the cathode now faces the anode, and the current is run for another two hours. Buffer exchange and current reversal are repeated two more times before retrieving the NL-SWNT solution (eight hours total of electrodialysis).

To retrieve the nanoassemblies, the capped dialysis tube was washed using Milli-Q purified water and was then placed in a beaker with 0.1 M $Na_2HPO_4$ buffer and ultra-sonicated for 30 seconds to 1 minute in a Branson 2510 sonicator. This releases any nanoassemblies stuck on the membranes back into the solution contained inside the dialysis tube. The tube was then uncapped and the purified nanoassembly suspension was recovered using an appropriate pipette.

The UV absorbance at 260 nm was measured and compared to the absorbance of an unfiltered functionalized carbon nanotube sample. The self-assembly of NL-SWNTs on a polynucleotidic platform was most efficient when the UV absorbance of the purified solution at 260 nm is <5% of that of the initial solution. If the UV absorbance was higher, or if assembly efficiency was poor, electrodialysis was repeated with fresh filter membranes and buffer. The eight hour dialysis process was repeated three times on the same sample. Immediately after purification, functionalized carbon nanotube solutions were divided into 50 µl aliquots and stored in a −80° C. freezer where they were stable for months. Room temperature storage or 4° C. storage causes aggregation and decreased binding to platform after a few days; −20° C. might afford stability for weeks or months but there has not been a systematic study of functionalized carbon nanotube stability as a function of storage temperature.

Following this, non-denaturing polyacrylamide gel electrophoresis (ND-PAGE) was used to estimate the amount of free linker polynucleotide. Free linker polynucleotides migrated into the gel where they were quantified, while bound linker polynucleotides remained stuck on the carbon nanotubes that do not migrate from the well. 8% or 10% polyacrylamide gels were used (polymerized by 1% by volume of 10% ammonium persulfate (APS) and cross-linked by 0.075% by volume tetramethylethylenediamine [TEMED]) in a 1×TAE/$Mg^{2+}$ buffer (40 mM Trisacetate, 1 mM EDTA, 12.5 mM $Mg^{2+}$ acetate, pH 8.3). A constant field of 8 V/cm is applied across the gel (80 V, 10 cm length, I ~34 mA, 1 mm thick mini-gel) for 3-4 hours while the buffer temperature was kept at 15° C. A 10 base pair ladder (Invitrogen) was used in one of the gel lanes as a length reference. A lane of free linker polynucleotide complexes is included to allow quantitation. Finally, the gel is stained with Sybr Gold (Invitrogen) for 25 minutes and imaged using a Bio-Rad Molecular Imager FX.

Denaturing PAGE (8%, 7 M urea, 175 V, 17.5 V/cm, 60° C., stained similarly to ND-PAGE) was used to estimate the total amount of linker polynucleotide DNA in the sample after the electrodialysis procedure. The idea was that strong denaturing conditions and high temperature detach the linker polynucleotides from the nanotubes, so that the total can be measured. Here, a field strength of 17.5 V/cm seemed to be more effective at detaching linker polynucleotides than 8 V/cm. This could have been caused incidentally by greater heating, or perhaps the somewhat elevated field played a direct role since the carbon nanotubes do not migrate in the gel and are not free to move with the linker polynucleotides. From the total and the free linker polynucleotide concentration, the amount of linker polynucleotide bound to the carbon nanotubes was estimated (bound=total−free).

The amount of free and SWNT-bound linker polynucleotides varies between different preparations of NL-SWNTs; bound linker polynucleotide typically ranged from ~100 nM to 1 µM.

Example 4

Deposition of a Nanoassembly Array on a Surface Using a 20 Base Pair Spacer

To form an array of polynucleotide nanoassemblies (30) as illustrated in FIG. 3, polynucleotide nanoassemblies (20) as illustrated in FIG. 2 and produced as in Example 3 were deposited on a charged surface. Deposition of the nanoassemblies (Example 3) is carried out on a fresh peeled mica surface using a solution with 5 μL of dispersed/nanoassemblies (Example 3) and 40 μL containing 1×TAE $Mg^{2+}$ and 0.75 M NaCl. Alternatively, the dispersed/nanoassemblies can be deposited using exclusively 1×TAE $Mg^{2+}$, the 1×TAE $Mg^{2+}$ solution can then be removed and the 0.75 M NaCl 0.01 M $Na_2HPO_4$ solution applied. The sample is then incubated at 20° C. to 60° C. for 15 to 300 minutes. To stop diffusion and desorption, the deposition solution is removed, and 40 μL of 1×TAE $Mg^{2+}$ and 7.5 μL of 10 mM $Ni^{2+}$ Acetate solution added.

The mica surface can be replaced by an oxygen plasma activated $SiO_2$ surface.

Example 5

In Silico Design and Testing of a 60 Base Pair Duplex N-Mer Linker Polynucleotide To create a linker polynucleotide with a 60 base duplex region to increase the spacing of carbon nanotubes in an array, a linker with a 60 base spacer was designed using the original 20 base spacer containing linker polynucleotide (Example 1) as a template. The new linker uses the following two strands: (i) 5'-TTTTTTTTTTTTTTTTTTTTTTTTTTTTTTGTTGC GAGGTCTTGCCGACAACGAAAATTT TCGTTGTCTC- TATCCCATTGGATAGAGACA-3' (SEQ ID NO. 7), and (ii) 5'-TTTTCGTTGTCTCTATCCAATGGGATA- GAGACAACGAAAATTTTCGTTGTCGGCAAG ACCTCGCAAC-3' (SEQ ID NO. 8). The new linker has 30 nucleotides of polyT and the same association domain sequence as the linker in Example 1: 5'-TTTTCGT-3' (SEQ ID NO. 2). The two ends of the duplex segment on the new linker have the exact same sequence as the linker polynucleotide of Example 1.

Figure 10:
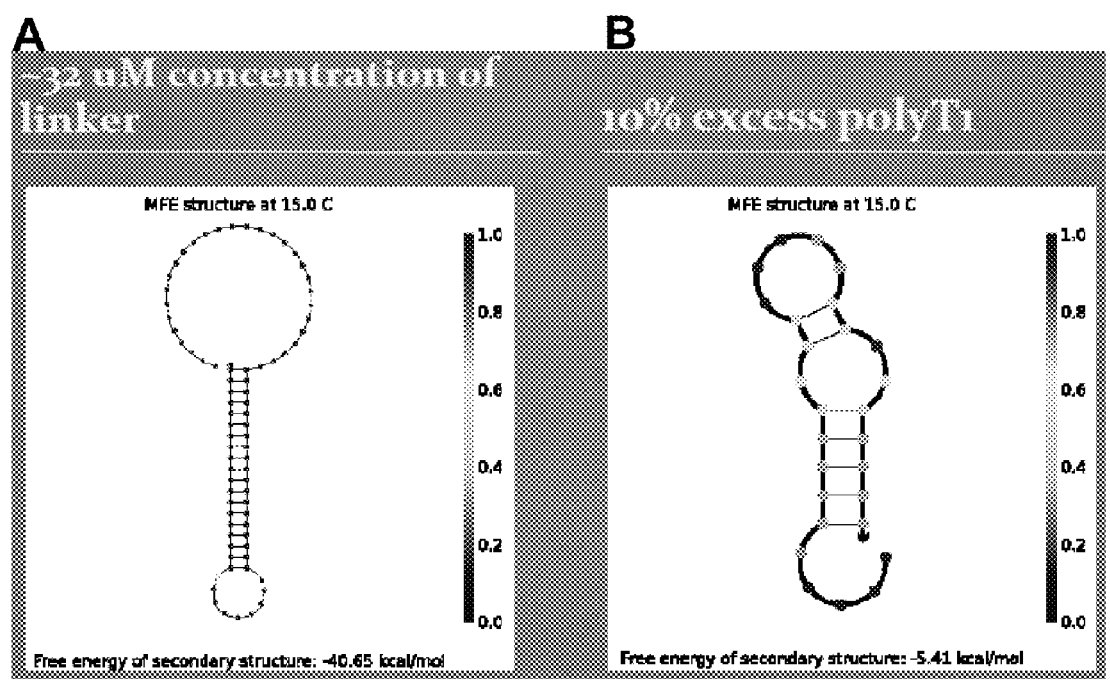
FIG. 10 shows schematic representation of possible minimal free energy secondary structures for a linker according to some embodiments. In particular, Panels A and B show a schematic of the minimal free energy secondary structures for a linker with a 20 nucleotide spacer (Panel A) and one of its constituent polynucleotides (Panel B) as calculated using software standard for the art. In particular Panel A shows a schematic of the minimal free energy secondary structure a linker formed from two polynucleotide strands, and in particular a 57 nucleotide polynucleotide and a 20 nucleotide polynucleotide. Panel B shows a schematic of the minimal free energy secondary structure of a the 20 nucleotide polynucleotide of the linker shown in Panel A.

FIG. 10 shows the minimal free energy secondary structures for a linker with a 20 nucleotide spacer and one of its constituent polynucleotides as calculated using software standard for the art. FIG. 10A shows a linker formed from two polynucleotide strands. The linker is at 32 μM concentration in 1 M NaCl at 15° C. The linker consists of a 57 nucleotide polynucleotide strand and a 20 nucleotide polynucleotide strand. FIG. 10B shows the minimal free energy secondary structure of the 20 nucleotide polynucleotide. It is assumed in the calculation that the 57 nucleotide strand is at ~32 μM concentration while the 20 nucleotide strand is at a 10% excess. Thus, the calculation predicts that ~3.2 μM of the 20 nucleotide strand will be unpaired in the conformation shown.

Figure 11:
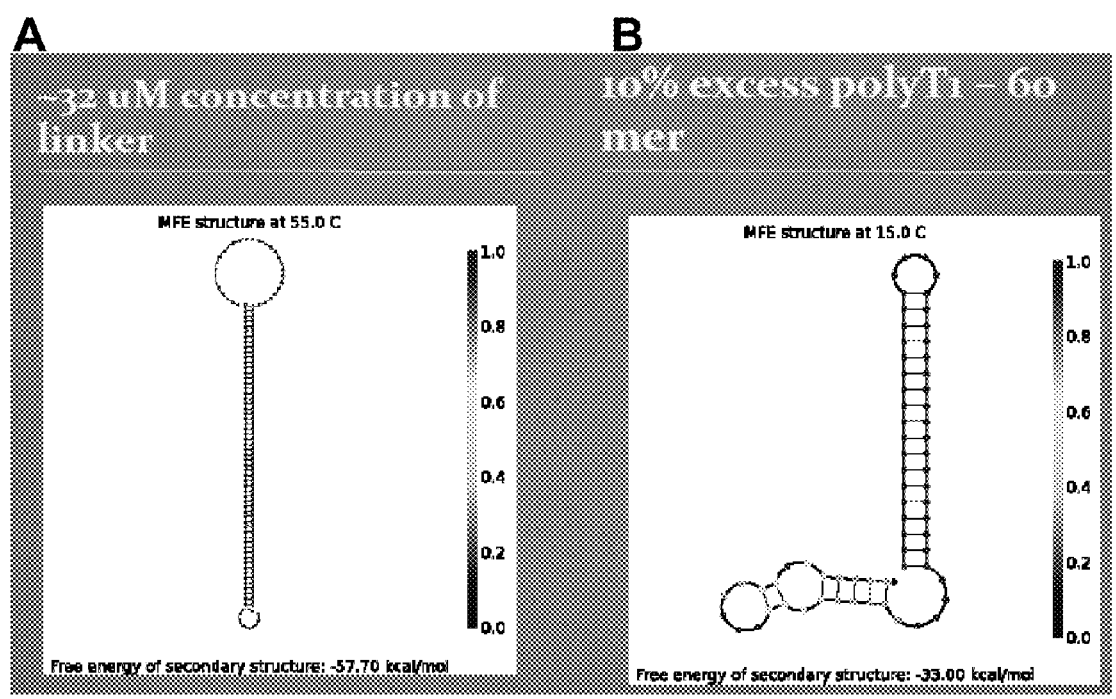
FIG. 11 shows schematic representation of possible minimal free energy secondary structures for a linker according to some embodiments. In particular, Panels A and B show a schematic of the minimal free energy secondary structures for a linker with a 60 nucleotide spacer (Panel A) and one of its constituent polynucleotides (Panel B) as calculated using software standard for the art. In particular, Panel A shows the expected secondary structure conformation of a linker composed of a 97 nucleotide polynucleotide and a 60 nucleotide polynucleotide Panel B shows a schematic of the secondary structure of the remaining ~3.2 µM concentration of unpaired 60 nucleotide strand of the linker shown in Panel A.
Figure 12:
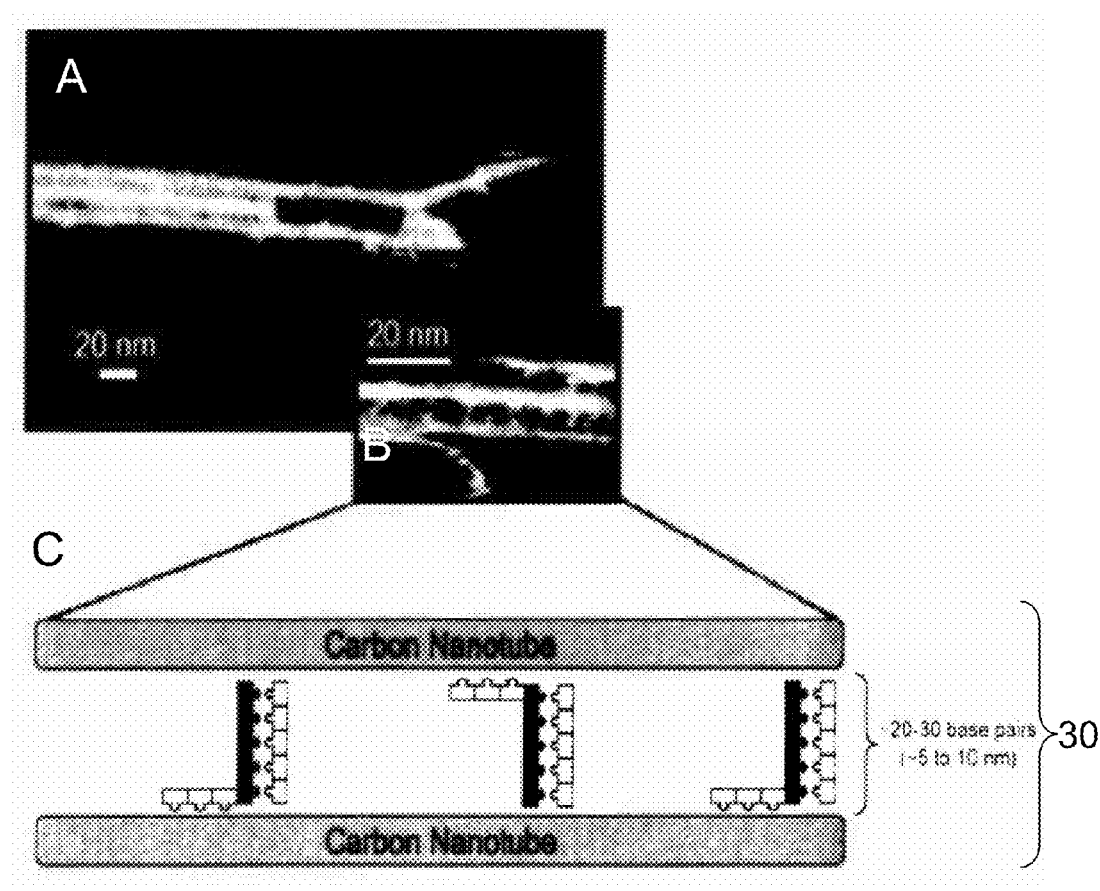
FIG. 12 shows a schematic illustration of nanoassembly arrays according to several embodiments. Panel A and Panel B show atomic force microscopy images of the carbon nanotube arrays while Panel C shows a schematic of the carbon nanotube array. For this panel, the dispersal domain is 40 nucleotides, the spacer is 15 base pairs, and the association domain region is 7 to 10 nucleotides.

FIG. 11 shows the minimal free energy secondary structures for a linker with a 60 nucleotide spacer and one of its constituent polynucleotides as calculated using software standard for the art. The calculation predicts the secondary structure conformation of equilibrium reaction products in aqueous solution in 1 M NaCl at a temperature of 15° C. The linker is composed of a 97 nucleotide polynucleotide and a 60 nucleotide polynucleotide. The 97 nucleotide strand is at a concentration of ~32 μM and the 60 nucleotide strand is at a 10% excess. The simulation predicts that nearly all 97 nucleotide strands will base pair with a 60 nucleotide strand to form a linker. FIG. 11A shows the expected secondary structure conformation of the linker. FIG. 11B shows the secondary structure of the remaining ~3.2 μM concentration of unpaired 60 nucleotide strand. Note that the unpaired secondary structure itself has extensive secondary structure to avoid undesirable adsorption on the nanomaterials.

Example 6

Formation of Linker Polynucleotides Having a 60 Base Pair Spacer

To form linker polynucleotides with a 60 base pair spacer, the procedure of Example 1 was followed for the sequences described in the above Example 5.

Example 7

Dispersal of Carbon Nanotubes with Linker Polynucleotides Having a 60 Base Pair Spacer To form nanoassemblies comprising a linker polynucleotide have a 60 base pair spacer according to Example 5, the procedure of Example 2 was carried out.

Example 8

Removal of Excess Free Linker Polynucleotide from a Preparation of Carbon Nanotubes Dispersed with Linker Polynucleotides Having a 60 Base Pair Spacer To remove excess free linker polynucleotides from a preparation of nanoassemblies formed according to Example 7 with the linkers designed according to Example 5, the procedure of Example 3 was carried out.

Example 9

Formation of Carbon Nanotube Arrays with Linker Polynucleotides Having a 60 Base Pair Spacer To form carbon nanotube arrays with the nanoassemblies produced and purified according to Example 7 and Example 8, the procedure of Example 4 was carried out. Results of imaging experiments for arrays of the present example are discussed in Example 11.

Example 10

Imaging of Nanoassembly Arrays on a Surface Using a 20 Base Pair Spacer

To determine whether arrays of polynucleotide nanoassemblies were formed (Example 4) and to further analyze such arrays, visualization of the arrays via microscopy was required. In particular, atomic force microscopy was used to directly visualize the arrays formed according to the examples above.

Figure 8:
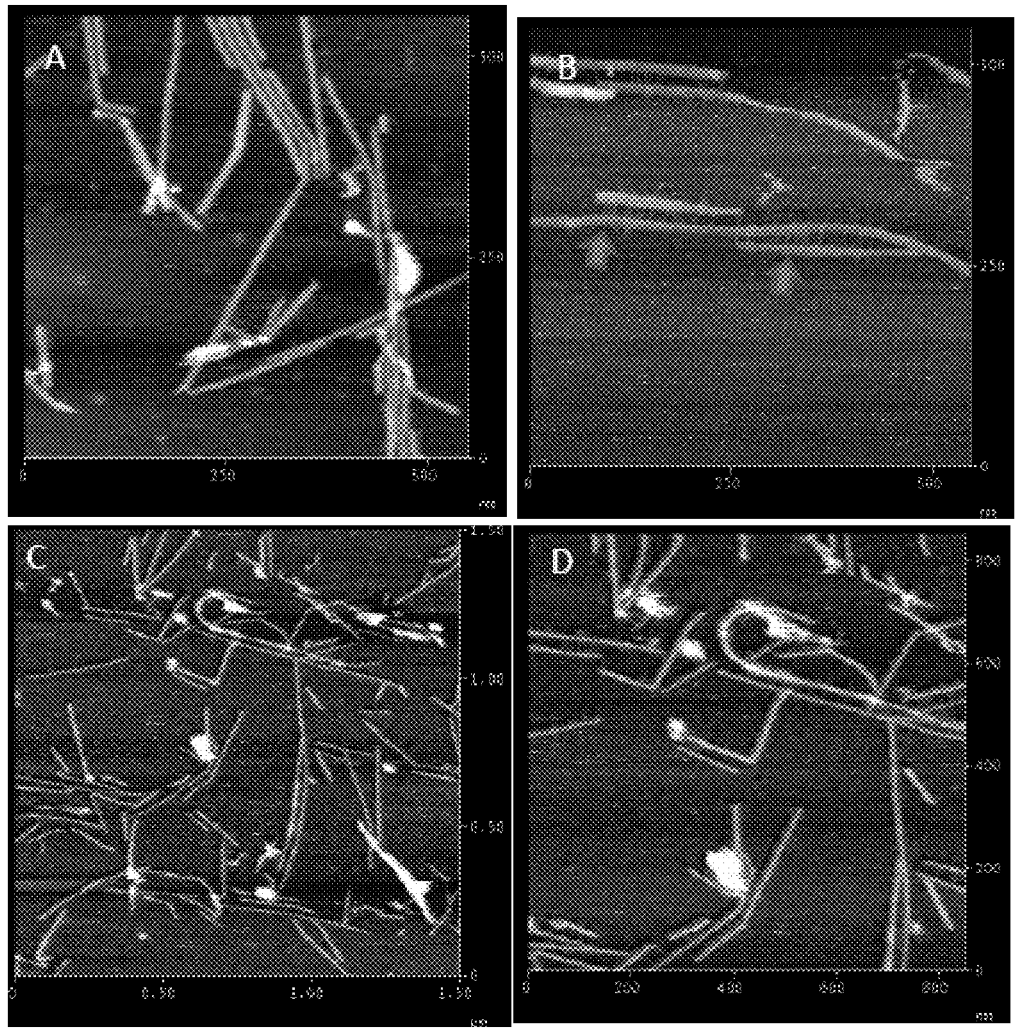
FIG. 8 shows atomic force microscopy images of nanoassembly arrays according to several embodiments. Panel A is the same picture as FIG. 7, Panel C. Panels B-D depict arrays with linker polynucleotides with dimensions according to FIG. 6.
Figure 9:
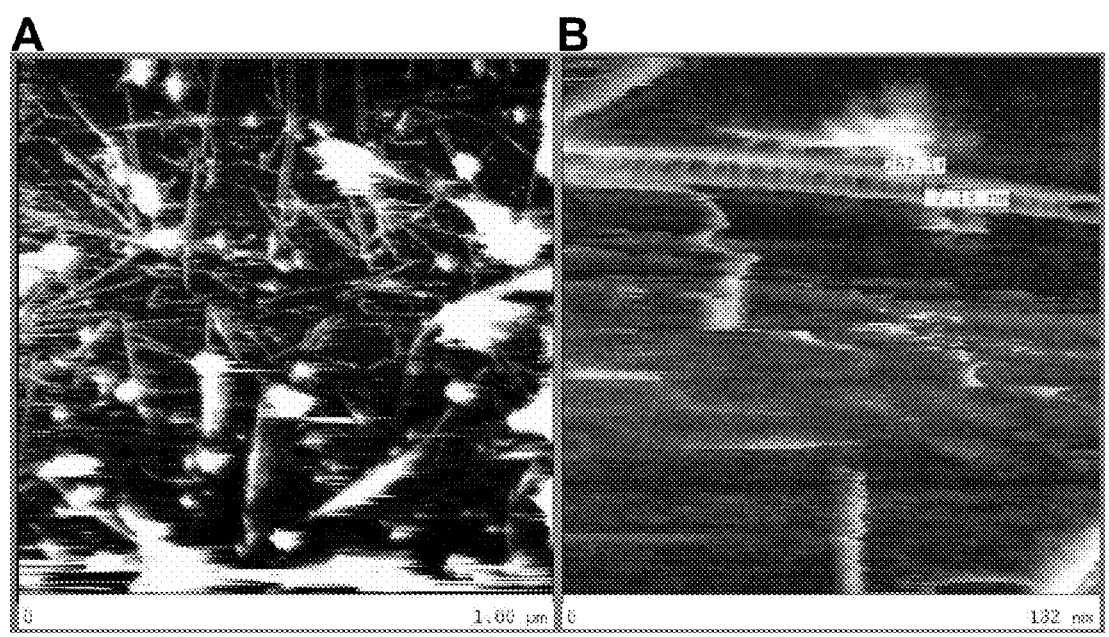
FIG. 9 shows atomic force microscopy images of nanoassembly arrays according to several embodiments. Panel A shows a 1 µm×1 µm image of nanotube arrays, while Panel B shows an enlargement of the image shown in FIG. 7A.

FIG. 8A is a 182 nm by 182 nm topographic AFM image taken on mica surface under fluid. It shows two parallel single wall carbon nanotubes kept aligned at fixed separation by DNA spacers (Example 3). The spacers are visible as small bridging segments between the two nanotubes. The dimensions of the linker polynucleotides for this image and all subsequent ones in FIG. 4 are: Segment A (11)—30 nucleotides; Segment B (13)—7 nucleotides; spacer (12)—20 base pairs.

FIG. 8B-F show parallel SWNT arrays assembled using the same linker polynucleotide. Notice that the nanotubes are kept at a regular separation. This separation is consistent with that expected from a 20 base-pair dsDNA spacer (~10 nm including ~6.5 nm for dsDNA spacer and ~2.5 nm for width attributed to the carbon nanotube itself and its associated single stranded DNA. FIG. 9A shows the same picture as FIG. 4C.

Example 11

Imaging of Nanoassembly Arrays on a Surface Using a 60 Base Pair Spacer

To determine whether arrays of polynucleotide nanoassemblies were formed following the procedure of Example 9 and to further analyze such arrays, visualization of the arrays via microscopy was required. In particular, atomic force microscopy was used to directly visualize the arrays formed according to the examples above.

FIG. 9B-D show topographic AFM scans of parallel SWNTs assembled using a linker polynucleotide with the following dimensions: Segment A (11)—30 nucleotides; Segment B (13)—7 nucleotides; spacer—60 base pairs. Note that FIG. 9A and FIG. 9B are at similar size scales ~550 nm×550 nm. The carbon nanotubes with 60 base pair spacers have clearly greater separation. In FIG. 9B, the arrows point to dsDNA spacers visible as thin strands running between parallel SWNTs (note that the carbon nanotubes appear wider than their actually are because of distortion effects from the AFM tip and scanning process). Similar structures are visible in FIG. 9C and FIG. 9D, proving the proposed structures from FIG. 2 and FIG. 3.

Figure 7:
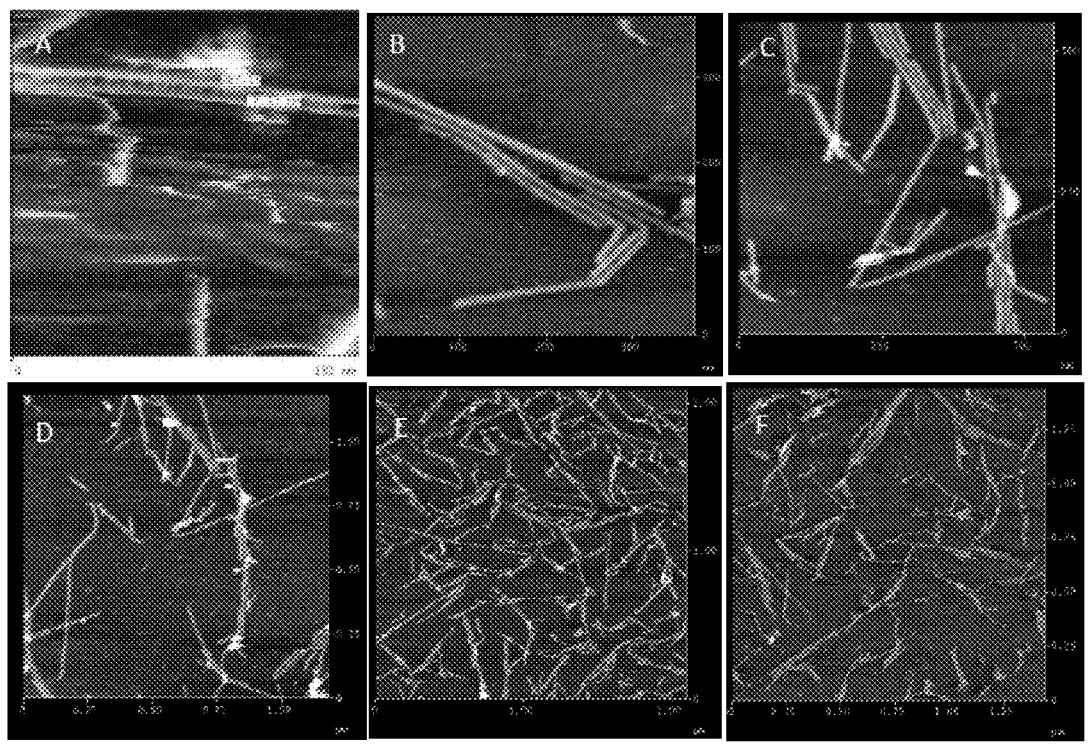
FIG. 7 shows atomic force microscopy images of nanoassembly arrays according to several embodiments. All Panels A to F are images for linker polynucleotides with dimensions according to FIG. 6.

Additional images are shown in FIG. 7, where atomic force microscopy images of carbon nanotube arrays formed with a linker polynucleotide configured as schematically illustrated in FIG. 6, are shown. The linker and the carbon nanotube were assembled as according to procedures exemplified in previous examples.

The examples set forth above are provided to give those of ordinary skill in the art a complete disclosure and description of how to make and use the embodiments of the polynucleotides, structures, assemblies, arrangements, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, Detailed Description, and Examples is hereby incorporated herein by reference.

Further, the hard copy of the sequence listing submitted herewith and the corresponding computer readable form are both incorporated herein by reference in their entireties.

It is to be understood that the disclosures are not limited to particular compositions or biological systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any methods and materials similar or equivalent to those described herein can be used in the practice for testing of the specific examples of appropriate materials and methods are described herein.

A number of embodiments of the disclosure have been described. Nevertheless, it will be understood that various modifications can be made without departing from the spirit and scope of the present disclosure. Accordingly, other embodiments are within the scope of the following claims.

REFERENCES

[1] C. Dwyer, V. Johri, M. Cheung, J. Patwardhan, A. Lebeck, and D. Sorin. Design tools for a DNA-guided self-assembling carbon nanotube technology. *Nanotechnology*, 15(9): 1240-1245, 2004.

[2] M. Zheng, A. Jagota, E. D. Semke, B. A. Diner, R. S. Mclean, S. R. Lustig, R. E. Richardson, and N. G. Tassi. DNA-assisted dispersion and separation of carbon nanotubes. *Nature Materials,* 2(5):338-342, 2003.

[3] M. Zheng, A. Jagota, M. S. Strano, A. P. Santos, P. Barone, S. G. Chou, B. A. Diner, M. S. Dresselhaus, R. S. Mclean, G. B. Onoa, G. G. Samsonidze, E. D. Semke, M. Usrey, and D. J. Walls. Structure-based carbon nanotube sorting by sequence-dependent DNA assembly. *Science,* 302(5650): 1545-1548, 2003.

[4] Y. Lu, S. Bangsaruntip, X. Wang, L. Zhang, Y. Nishi, and H. Dai. DNA functionalization of carbon nanotubes for ultrathin atomic layer deposition of high k dielectrics for nanotube transistors with 60 mv/decade switching. *J. Am. Chem. Soc.,* 128(11):3518-3519, 2006.

[5] K. Mizuno, J. Ishii, H. Kishida, Y. Hayamizu, S. Yasuda, D. N. Futaba, M. Yumura, and K. Hata. A black body absorber from vertically aligned single-walled carbon nanotubes. *PNAS,* 106: 6044-7, 2009.

[6] G. S. Tulevski, J. Hannon, A. Afzali, Z. Chen, P. Avouris, and C. R. Kagan. Chemically Assisted Directed Assembly of Carbon Nanotubes for the Fabrication of Large-Scale Device Arrays. *J. Am. Chem. Soc.* 129, 11964-11968, 2007.

[7] Q. Cao and J. A. Rogers. Ultrathin films of single-walled carbon nanotubes for electronics and sensors: a review of fundamental and applied aspects. *Advanced Materials, Vol.* 21: 29-53, 2009.

What is claimed is:

1. A linker polynucleotide spacing a first nanomaterial from a second nanomaterial, the linker polynucleotide comprising:
   a first moiety directly attaching the first nanomaterial, the direct attachment between the first moiety and the first nanomaterial having a first affinity;
   a second moiety distanced from the first moiety, directly attaching the second nanomaterial, the direct attachment between the second moiety and the second nanomaterial having a second affinity, the second affinity being lower than the first affinity; and
   a spacer adapted to define a distance between the first nanomaterial and the second nanomaterial,
wherein the spacer and the second moiety are arranged in a hairpin structure having a stem and a loop in which the spacer is comprised in the stem of the hairpin structure and the second moiety is comprised in the loop of the hairpin structure, and in which the spacer presents the first moiety attached to the first nanomaterial.

2. The linker polynucleotide according to claim 1, wherein the spacer comprises a polynucleotide duplex of between 3 and 200 base pairs.

3. The linker polynucleotide according to claim 1, wherein the first moiety comprises a single stranded polynucleotide of at least 10 nucleotides.

4. The linker polynucleotide according to claim 1, wherein the second moiety comprises a single stranded polynucleotide strand of between 1 and 15 nucleotides.

5. The linker polynucleotide according to claim 1, wherein the direct attachment of at least one of the first moiety and the second moiety is performed through physisorption.

6. The linker polynucleotide according to claim 1, wherein:
   the first moiety comprises a single stranded polynucleotide of at least 10 nucleotides;
   the second moiety comprises a single stranded polynucleotide strand of between 1 and 15 nucleotides; and
wherein the single stranded polynucleotide of the second moiety is shorter than the single stranded polynucleotide of the first moiety.

7. The linker polynucleotide according to claim 1, wherein:
   the first moiety comprises a single stranded polynucleotide;
   the second moiety comprises a single stranded polynucleotide; and
wherein the single stranded polynucleotide of the second moiety is shorter than the single stranded polynucleotide of the first moiety, and the direct attachment is performed through physisorption.

8. The linker polynucleotide of claim 1, wherein the first moiety, second moiety, and spacer are made from locked nucleic acids (LNA).

9. The linker polynucleotide of claim 1, wherein the first moiety, second moiety, and spacer are made from peptide nucleic acids (PNA).

10. The linker of claim 1, wherein the first nanomaterial and second nanomaterial comprise carbon nanotubes arranged in a ribbon shaped polynucleotide structure.

11. A nanoassembly configured to form an array of spaced and linked nanomaterials, the nanoassembly comprising at least one linker polynucleotide according to claim 1.

12. The nanoassembly according to claim 11, wherein the first nanomaterial is a carbon nanotube.

13. An array of spaced and linked nanomaterials, comprising a plurality of nanoassemblies according to claim 11 attached one to the other through respective second moieties thereof, wherein the first nanomaterial and/or the second nanomaterial of the plurality of nanoassemblies is attached to the second moiety of another nanoassembly of the plurality of nanoassemblies, the one and the other nanoassembly having a same first nanomaterial or second nanomaterial.

14. The array according to claim 13, wherein some or all of the nanomaterials are carbon nanotubes.

15. The array according to claim 14, wherein the nanomaterials are spaced substantially parallel to each other.

16. The array of claim 14, wherein the carbon nanotubes are arranged in a two-dimensional array.

17. The array of claim 16, wherein the array is on a surface on which the carbonanotubes are spaced.

18. The array of claim 14, wherein the carbon nanotubes are arranged in a three-dimensional array.

19. The array of claim 14, wherein the carbon nanotubes are arranged in a ribbon shaped polynucleotide structure.

20. The array of claim 14, wherein the carbon nanotubes are arranged in a two dimensional sheet.

21. The array of claim 14, wherein the carbon nanotubes are arranged in a vertically standing forest.

22. The array of claim 14, wherein the carbon nanotubes are arranged in a film.

23. The array according to claim 13, said array being on a surface on which the nanomaterials are spaced therebetween.

24. A method to produce an arrangement of spaced nanomaterials, comprising
 providing at least two nanoassemblies according to claim 11;
 providing a surface;
 incubating the at least two nanoassemblies on the surface for a time and under conditions to allow self-assembly of the nanomaterials in the arrangement.

25. The method of claim 24, wherein the surface is selected from the group consisting of silicon, mica, flexible polymer sheets, and glass.

26. The method of claim 24, wherein the incubating of the nanoassemblies on the surface is performed by depositing the at least two nanoassemblies on the surface for up to 90 minutes in presence of a solution including a bivalent metallic cation.

27. The method of claim 24, wherein the arrangement is located on the surface.

28. The method of claim 24, wherein at least a portion of the arrangement is located outside the surface.

29. The method according to claim 24, the method further comprising applying an aligning force to the nanoassemblies.

30. A composition comprising
 at least one nanoassembly according to claim 11, and
 a suitable vehicle or diluent.

31. A system for formation of an arrangement of nanomaterials, comprising
 at least two nanoassemblies according to claim 11;
 a surface, adapted to allow formation of the arrangement comprising the at least two nanoassemblies; and
 reagents suitable to allow self-assembly of the nanomaterials of the nanoassemblies on the surface,
 the at least two nanoassemblies, the surface and the reagents adapted to be combined to allow formation of the arrangement of nanomaterials.

32. An arrangement of nanomaterials, comprising
 at least two nanoassemblies arranged on a surface to form an array according to claim 13 in which the at least two nanoassemblies are parallel with each other.

* * * * *

SEQUENCE LISTING

<160> NUMBER OF SEQ ID NOS: 8

<210> SEQ ID NO 1
<211> LENGTH: 30
<212> TYPE: DNA
<213> ORGANISM: Artificial sequence
<220> FEATURE:
<223> OTHER INFORMATION: Synthetic oligonucleotide

<400> SEQUENCE: 1
tttttttttt tttttttttt tttttttttt                                    30

<210> SEQ ID NO 2
<211> LENGTH: 7
<212> TYPE: DNA
<213> ORGANISM: Artificial sequence
<220> FEATURE:
<223> OTHER INFORMATION: Synthetic oligonucleotide

<400> SEQUENCE: 2 ttttcgt                                                              7

<210> SEQ ID NO 3
<211> LENGTH: 27
<212> TYPE: DNA
<213> ORGANISM: Artificial sequence
<220> FEATURE:
<223> OTHER INFORMATION: Synthetic oligonucleotide

<400> SEQUENCE: 3
caacgctcca gaacggctgt tgctttt                                       27

<210> SEQ ID NO 4
<211> LENGTH: 50
<212> TYPE: DNA
<213> ORGANISM: Artificial sequence
<220> FEATURE:
<223> OTHER INFORMATION: Synthetic oligonucleotide

<400> SEQUENCE: 4
acagccgttc tggagcgttg tttttttttt tttttttttt tttttttttt              50

<210> SEQ ID NO 5
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 5
caacgctcca gaacggctgt                                               20

<210> SEQ ID NO 6
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 6
acagccgttc tggagcgttg                                               20

<210> SEQ ID NO 7
<211> LENGTH: 90
<212> TYPE: DNA
<213> ORGANISM: Artificial sequence

```
<220> FEATURE:
<223> OTHER INFORMATION: Synthetic oligonucleotide

<400> SEQUENCE: 7
tttttttttt tttttttttt tttttttttt gttgcgaggt cttgccgaca acgaaaattt        60
tcgttgtctc tatcccattg gatagagaca                                        90

<210> SEQ ID NO 8
<211> LENGTH: 67
<212> TYPE: DNA
<213> ORGANISM: Artificial sequence
<220> FEATURE:
<223> OTHER INFORMATION: Synthetic oligonucleotide

<400> SEQUENCE: 8
ttttcgttgt ctctatccaa tgggatagag acaacgaaaa ttttcgttgt cggcaagacc        60
tcgcaac                                                                 67
```